United States Patent
Li et al.

(10) Patent No.: US 10,507,417 B2
(45) Date of Patent: Dec. 17, 2019

(54) SYSTEM AND METHOD FOR IMPROVING MASS AIR FLOW SIGNAL QUALITY

(71) Applicant: Cummins Filtration IP, Inc., Columbus, IN (US)

(72) Inventors: Miao Li, McFarland, WI (US); Peter K. Herman, Stoughton, WI (US); John C. Lukasavitz, Flushing, MI (US); Abhijit Shimpi, Columbus, IN (US); Gregory W. Hoverson, Columbus, IN (US); Thomas J. Braun, Stoughton, WI (US); Robert A. Bannister, Stoughton, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 439 days.

(21) Appl. No.: 15/304,322

(22) PCT Filed: Apr. 13, 2015

(86) PCT No.: PCT/US2015/025582
§ 371 (c)(1),
(2) Date: Oct. 14, 2016

(87) PCT Pub. No.: WO2015/160709
PCT Pub. Date: Oct. 22, 2015

(65) Prior Publication Data
US 2017/0036152 A1 Feb. 9, 2017

Related U.S. Application Data

(60) Provisional application No. 61/980,997, filed on Apr. 17, 2014.

(51) Int. Cl.
*B01D 35/02* (2006.01)
*F02M 35/10* (2006.01)
(Continued)

(52) U.S. Cl.
CPC ....... *B01D 46/0049* (2013.01); *B01D 46/522* (2013.01); *F02M 35/021* (2013.01);
(Continued)

(58) Field of Classification Search
CPC .............. B01D 46/0049; B01D 46/522; B01D 2265/04; B01D 2279/60; G01F 15/00;
(Continued)

(56) References Cited

U.S. PATENT DOCUMENTS

| 4,909,815 A | 3/1990 | Meyer |
| 5,573,811 A | 11/1996 | Townsley |

(Continued)

FOREIGN PATENT DOCUMENTS

WO  WO-2015/160709 A1  10/2015

OTHER PUBLICATIONS

International Search Report and Written Opinion for PCT/US2015/025582, dated Jul. 2, 2015, 8 pages.

(Continued)

*Primary Examiner* — Frank M Lawrence, Jr.
(74) *Attorney, Agent, or Firm* — Foley & Lardner LLP

(57) ABSTRACT

A filter assembly includes a conditioning device that conditions a flow of air upstream of a mass air flow sensor. The filter assembly includes a support frame. The filter assembly further includes a filter media coupled to the support frame, the filter media having a dirty side configured to receive a stream of air and a clean side configured to output a stream of air that has been filtered through the filter media. The filter assembly includes a conditioning device coupled to the support frame, the conditioning device positioned in a downstream direction from the clean side of the filter media with respect to the stream of air, the conditioning device offset from the clean side of the filter media by a separation distance.

19 Claims, 25 Drawing Sheets

(51) Int. Cl.
　　*B01D 46/00*　　(2006.01)
　　*G01F 15/00*　　(2006.01)
　　*G01F 15/12*　　(2006.01)
　　*F02M 35/02*　　(2006.01)
　　*B01D 46/52*　　(2006.01)
　　*F02M 35/024*　　(2006.01)

(52) U.S. Cl.
　　CPC .. *F02M 35/0207* (2013.01); *F02M 35/02416* (2013.01); *F02M 35/02466* (2013.01); *F02M 35/10386* (2013.01); *G01F 15/00* (2013.01); *G01F 15/125* (2013.01); *B01D 2265/04* (2013.01); *B01D 2279/60* (2013.01); *F02M 35/02491* (2013.01); *F02M 35/10249* (2013.01)

(58) Field of Classification Search
　　CPC ......................... G01F 15/125; F02M 35/0207; F02M 35/021; F02M 35/02416; F02M 35/02466; F02M 35/02491; F02M 35/10249; F02M 35/10386
　　USPC .................. 55/315, 482, 497, 511
　　See application file for complete search history.

(56) References Cited

U.S. PATENT DOCUMENTS

| | | | |
|---|---|---|---|
| 5,631,415 A | 5/1997 | Igarashi et al. | |
| 6,047,903 A | 4/2000 | Meyer | |
| 6,112,590 A | 9/2000 | Rilling | |
| 6,145,544 A | 11/2000 | Dutertre et al. | |
| 6,156,089 A * | 12/2000 | Stemmer | B01D 46/0036 55/467 |
| 6,199,434 B1 | 3/2001 | Cornil et al. | |
| 6,464,761 B1 * | 10/2002 | Bugli | F02M 35/024 123/198 E |
| 6,736,871 B1 * | 5/2004 | Green | B01D 46/0036 55/385.3 |
| 6,764,533 B2 * | 7/2004 | Lobiondo, Jr. | B03C 3/155 55/493 |
| 7,097,694 B1 | 8/2006 | Jaroszczyk et al. | |
| 7,531,029 B2 * | 5/2009 | Hoke | B01D 53/0415 96/134 |
| 8,062,403 B2 * | 11/2011 | Goode | B01D 46/0005 55/482 |
| 9,827,524 B2 | 11/2017 | Lukasavitz | |
| 2004/0055570 A1 * | 3/2004 | Bielicki | F02M 35/021 123/402 |
| 2004/0255660 A1 | 12/2004 | Abdolhosseini et al. | |
| 2006/0180389 A1 | 8/2006 | Cheng et al. | |
| 2009/0120046 A1 * | 5/2009 | Huff | B01D 46/0036 55/290 |
| 2010/0186353 A1 | 7/2010 | Ackermann et al. | |
| 2010/0269583 A1 | 10/2010 | Jasnie | |

OTHER PUBLICATIONS

International Search Report and Written Opinion issued for PCT/US2017/054902, dated Dec. 11, 2017, 16 pages.

International Standard ISO 5167-6 "Measurement a Fluid Flow by Means of Pressure Differential Devices Inserted in Circular Cross-Section Conduits Running Full," Part6: Wedge Meters, 2019, 20 pages.

* cited by examiner

SYSTEM AND METHOD FOR IMPROVING MASS AIR FLOW SIGNAL QUALITY

CROSS-REFERENCE TO RELATED APPLICATIONS

This Application is a U.S. national stage application claiming the benefit of International Application No. PCT/US2015/025582, filed on Apr. 13, 2015, which claims priority to U.S. Provisional Patent Application No. 61/980,997, entitled "SYSTEM AND METHOD FOR IMPROVING MASS AIR FLOW SIGNAL QUALITY," filed on Apr. 17, 2014. The contents of both applications are herein incorporated by reference in their entirety and for all purposes.

TECHNICAL FIELD

The present invention relates generally to air filtration systems having air flow conditioning devices that improve the quality of signal from a mass air flow (MAF) sensor.

BACKGROUND

Internal combustion engines generally combust a mixture of fuel (e.g., gasoline, diesel, natural gas, etc.) and air. Prior to entering the engine, the air is typically passed through an air filtration system. A mass air flow (MAF) sensor is placed downstream of the air filter (i.e., on the clean side of the air filter media) and provides feedback to an engine control module (ECM). However, the quality of air flow exiting the filter element may be inconsistent resulting in high variation of the signal response of MAF sensor. The inconsistencies in the air flow may be the result of random stream-wise orientations of filter media pleats that result in air flow pointing directly at a MAF sensor window or results in air flow pointing away from a MAF sensor window. The inconsistencies in air flow may be the result of variation of embossment positions on the filter media pleats too. Embossments on media pleats act as spacers between the individual media pleats. Embossments also block air flow coming out from between pleats. Thus, the presence of embossments creates a flow-around-bluff-body situation, where flow structures, such as vortices, eddies, bubbles etc. can be resulted and thus affect MAF sensor signal quality. Moreover, embossments aren't precisely and repetitively positioned on media pleats relative to filter frame (i.e., some of the embossments may be closer to one edge of frame and while some embossments may be further away from other edges of the frame). The variations in embossments consequently introduce variation of flow pattern downstream of the filter media where the MAF sensor is located. The inconsistencies in air flow may also arise from other factors, such as variations of pleat shape or spacing and differing pleat counts. The present application addresses these inconsistencies and therefore improves the signal quality of MAF sensor output.

SUMMARY

One embodiment relates to a filter assembly. The filter assembly includes a support frame. The filter assembly further includes a filter media coupled to the support frame, the filter media having a dirty side configured to receive a stream of air and a clean side configured to output a stream of air that has been filtered through the filter media. The filter assembly includes a conditioning device coupled to the support frame, the conditioning device positioned in a downstream direction from the clean side of the filter media with respect to the stream of air, the conditioning device offset from the clean side of the filter media by a separation distance. The conditioning device is a secondary device is placed upstream of a MAF sensor in an air flow duct. In particular embodiments, the conditioning device comprises a mesh screen. In other embodiments, the rectification device comprises a secondary media.

Another embodiment relates to a method of filtering a stream of air. The method includes providing a filter assembly. The filter assembly includes a support frame, a filter media coupled to the support frame, and a conditioning device coupled to the support frame and positioned in a downstream direction from a clean side of the filter media with respect to the stream of air. The conditioning device is offset from the clean side of the filter media by a separation distance. The method further includes providing a mass air flow sensor positioned downstream of the conditioning device with respect to the stream of air. The method includes routing the stream of air through the filter media, and then routing the stream of air through the conditioning device. The method still further includes routing at least a portion of the stream of air past the mass air flow sensor.

These and other features, together with the organization and manner of operation thereof, will become apparent from the following detailed description when taken in conjunction with the accompanying drawings.

DETAILED DESCRIPTION

Figure 1:
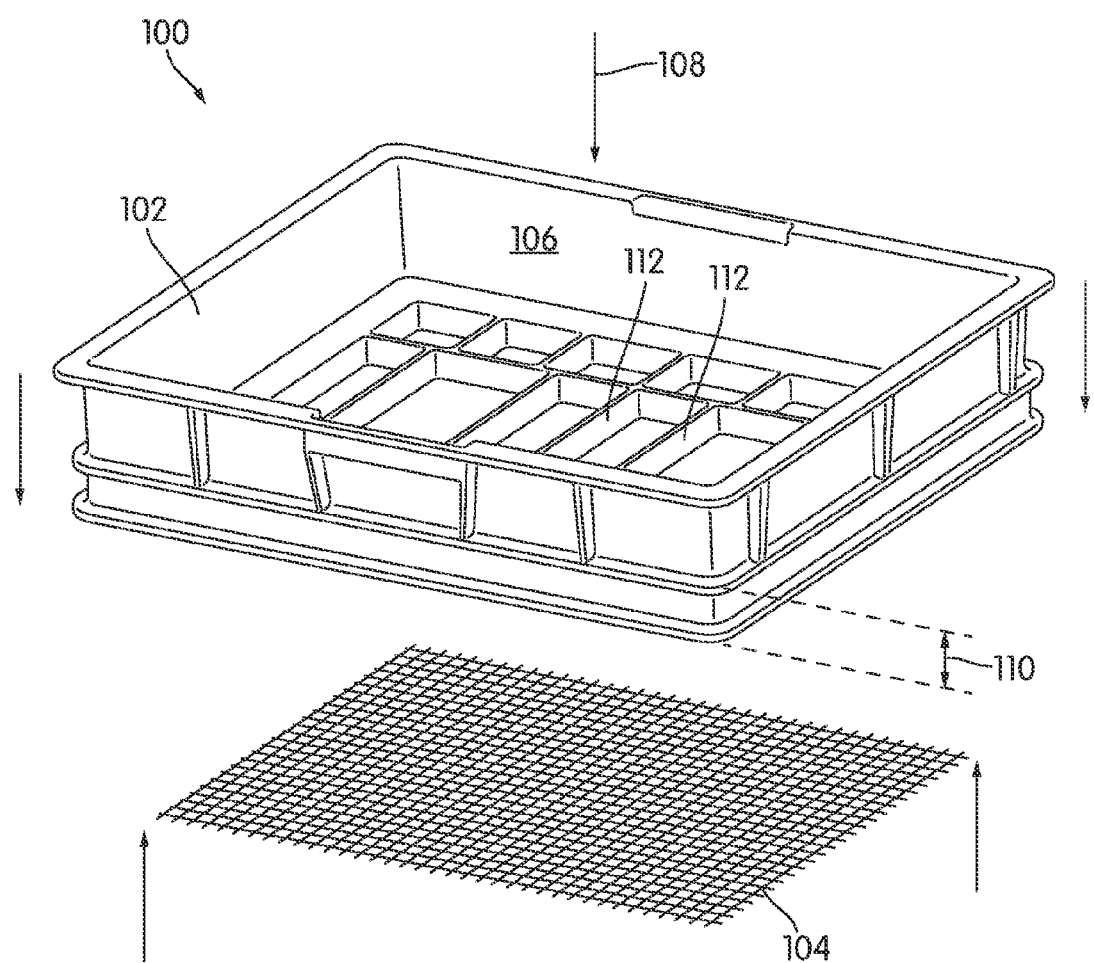
FIG. 1 shows an exploded perspective view of a filter panel housing according to an exemplary embodiment.

Referring to the figures generally, the various embodiments disclosed herein relate to air flow conditioning devices that improve the quality of mass air flow (MAF) sensor signal output in air filtration systems. The conditioning devices improve the accuracy and consistency of MAF sensor output by reducing or eliminating the above-described inconsistencies in air flow downstream of filter media. The MAF sensor may provide an output to an engine control module (ECM) of an internal combustion engine that receives filtered air from the air filtration system. The conditioning device is a secondary device placed downstream of an air filter media and upstream of a MAF sensor in an air flow duct of the air filtration system. The conditioning device reduces defects in the air stream exiting the filter media. The conditioning devices may be a mesh screen, a wire mesh, a foam, a perforated plate, or the like. Such conditioning devices provide an improved MAF sensor signal output in terms of normalized variation, which is defined below by equation 1.

$$\text{Normalized variation} = \frac{dQ}{Q}\% \quad (1)$$

In equation 1, Q is the bench mark flow rate at which the MAF-integrated system is tested, dQ is the maximum deviation of flow rates reported by MAF sensors of a group of MAF-integrated application from bench mark flow rate Q. Better MAF signal performance involves the removal or mitigation of part-to-part variation of the group of MAF-integrated application, by means of a flow conditioning device which is the purpose of current disclosure.

Additionally, since the conditioning devices are intended to be physically added to existing to filter panel frame by either over-mold or other means of manufacturing and is based on existing structure, potential changes and modifications, and thus the cost of them, to existing tooling and design are minimal.

As an air stream passes through a filter media, the air stream is disrupted. The degree of flow disruption is highly dependent on geometry of filter media pleats. This disruption translates any part-to-part variation of geometry of the filter media to any MAF sensors downstream of the filter media, which results in inconsistent and/or inaccurate outputs from the MAF sensors to an ECM or other devices. Adding a flow conditioning device with an appropriate K-factor downstream of the filter media helps to condition the air stream in order to provide a more accurate and more consistent MAF sensor signal outputs. The K-factor of a flow conditioning device is defined by equation 2 below.

$$K = \frac{\Delta p}{\frac{1}{2}\rho v^2} \quad (2)$$

In equation 2, $\Delta p$ is the pressure drop caused by the flow conditioning device, p is the density of the air, and v is the face velocity of the air stream going through the media. If the K-factor is zero, there is no pressure drop across the flow conditioning device, such scenario corresponds to an arrangement where no flow conditioning is used. The minimum K-factor of the conditioning devices is preferably approximately 8. In some arrangements, the minimum K-factor is approximately 1-10. The maximum useful K-factor is estimated to be approximately 100 (beyond which, all allowed $\Delta p$ of entire filter housing assembly is consumed by the flow conditioning device alone) The K-factor may be affected by the thickness of the conditioning device (e.g., the thickness of a layer of foam), the porosity (ratio of air volume/solid volume within the structure of the device) of the conditioning device, the pore size of the conditioning device if the conditioning device is comprises of foam-like materials, relative opening area of the material if the material is, e.g. perforated plate etc. By a conditioning device having the appropriate K-factor, unexpected disturbances caused by the inconsistencies of the filter media (e.g., caused by orientation effects, deformation from water soak, etc.) are mitigated.

Separation distance between the flow conditioning device and the filter media is another critical parameter, since most of filter media is made of media pleats, which causes inconsistencies in air stream. Adequate separation distance allows the inconsistencies in air stream to be diffused to some extents before air stream enters into the flow conditioning devices The range of such separation distance is approximately 0.1 of a pleat tip gap to 100 times of a pleat tip gap.

Secondary Mesh Screen Arrangements

Referring to FIG. 1, an exploded perspective view of a filter panel housing 100 is shown according to an exemplary embodiment. The filter panel housing includes a frame 102 and a mesh 104. The frame 102 may be a standard seven inch by seven inch housing. The housing 100 may be inserted into an air filtration system (e.g., as shown in FIG. 9). The air filtration system provides filtered air to a device, such as an internal combustion engine. The frame 102 includes a compartment 106 configured to secure a filter media (not shown). The mesh 104 is positioned in a downstream direction from the compartment. The filter media may be a foam-based filter media or a pleated filter media. The air filtration system in which the housing 100 is installed in may include a MAF sensor downstream of the housing 100. The mesh 104 is positioned between the filter media and the MAF sensor. The mesh 104 is attached to the bottom plane of the housing 102. The mesh 104 may be a plastic or metal mesh. The mesh 104 may be planar (i.e., flat) or slightly curved (e.g., concave or convex with respect to the air flow direction 108). A slightly curved mesh 104 increases the area through which an air stream goes through thereby decreasing the face velocity and the pressure drop across the mesh 104. The mesh 104 acts as an air flow conditioning device. Air to be filtered flows in an air flow direction 108 through the air filter media. After the air passes through the air filter media (and the compartment 106), the air passes through the mesh 104.

The mesh 104 is molded into the frame 102 (e.g., over-molded) at a location downstream of the compartment 106. The mesh 104 is offset from the clean side of the filter media by a distance 110. A support frame 112 of the housing 102 may support the mesh 104 and maintain the mesh at the distance 110 from the filter media.

Figure 7:
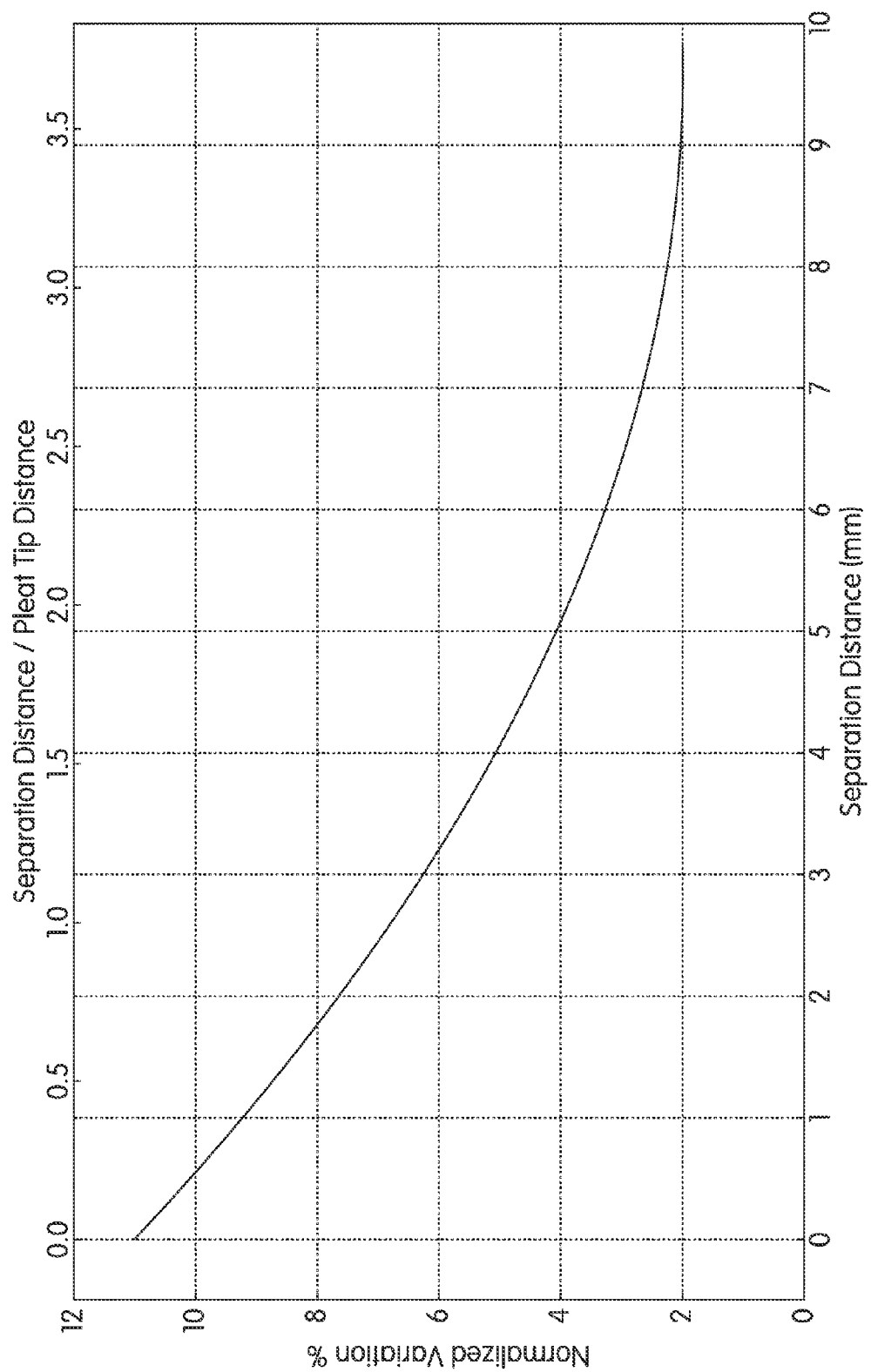

The distance 110 is greater than zero. The distance 110 is on the order of or greater than a pleat-to-pleat distance of the filter media. The distance 110 can start from as small as 0.1 of pleat tip distance up to 100 times of pleat tip distance, as illustrated in FIG. 7. The distance 110 depends on specific application (e.g., dimension, geometry, etc.) and flow rate. In some arrangements, the distance 110 is approximately 0-10 mm. In more particular arrangements, the distance 110 is approximately 6-8 mm. Across some other arrangements, the distance 110 can vary from a fraction of a pleat-to-pleat distance of the filter media to 10 or even 100 times of pleat-to-pleat distance. In such arrangements of appropriate K-factor and separation distance, the normalized variance (i.e., $\frac{dQ}{Q}\%$)

is within the range of ±1.5%. This represents an improvement over arrangements of no mesh 104 and/or arrangements having a separation distance 110 of zero, in which the variance in MAF sensor output is substantially higher. Accordingly, the mesh 104 improves the signal quality of the MAF sensor output (e.g., output signal quality to an ECM).

Various factors impact the K-factor of the mesh 104. K-factor depends on mesh pattern, opening size/shape, thread diameter, etc. If 104 is a perforated plate, K factor depends on again, size/shape of opening, thickness and pattern of openings, etc. The pore pattern of the mesh 104 may be uniform or non-uniform. Specific impacts of different pore size and thread diameter combinations may be tested by a computational fluid dynamics (CFD) simulation. The CFD simulation is able to yield streamlines that wrap around a MAF sensor, back tracing those streamlines is able to tell what part of the conditioning device those wrapping-around-MAF streamlines come from, thus determining what part(s) on the filter panel is (are) significant to MAF performance.

Figure 2:
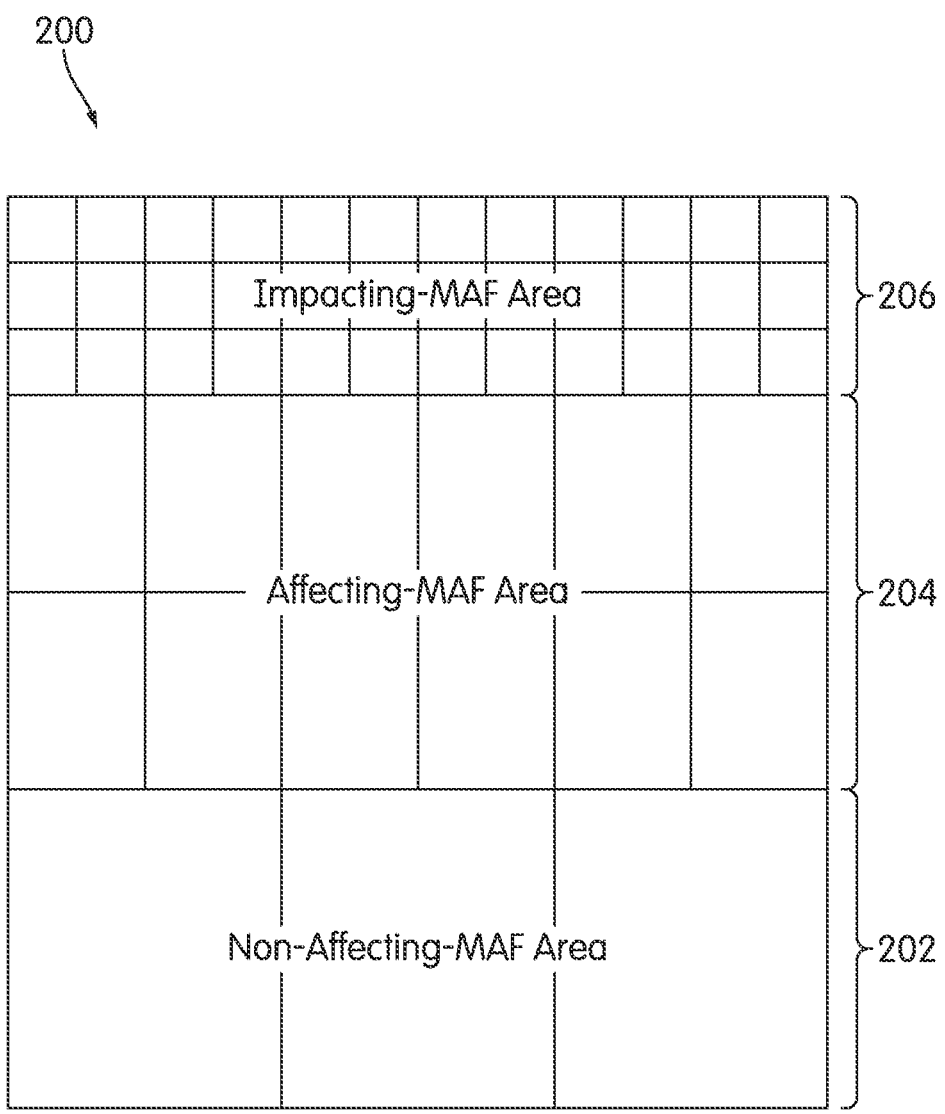
FIG. 2 shows a front view of an air conditioning mesh having a varying pore pattern according to an exemplary embodiment.

Referring to FIG. 2, a front view of an exemplary mesh 200 is shown according to an exemplary embodiment. The mesh 200 may be used in an air filtration system as described above with respect to mesh 104. The mesh 200 has a varying pore pattern and size. As shown in FIG. 2, the mesh 200 includes a first section 202 having a large pore pattern, a second section 204 having a medium pore pattern, and a third section 206 having a small pore pattern. The first section 202 having the large pore pattern has the smallest K-factor of the three sections because the air flow passes through the first section 202 with the least resistance. The third section 206 having the small pore pattern has the highest K-factor of the three sections because the air flow passes through the third section 206 with the most resistance. The third section 206 may be aligned with a MAF sensor positioned downstream of the mesh 200. Accordingly, the air stream impacting the MAF sensor's signal quality most significantly (i.e., the air flowing through the third section 206) is conditioned the most, while the air stream not impacting the MAF sensor's signal quality (i.e., the air flowing through the first section 202) is conditioned the least. Accordingly, the overall K-factor of the mesh 200 is lower than if the pore pattern of the third section 206 was used throughout the entire area of the mesh 200, which significantly reduces the restriction of such flow conditioning device.

Secondary Foam Media Arrangements

Figure 3:
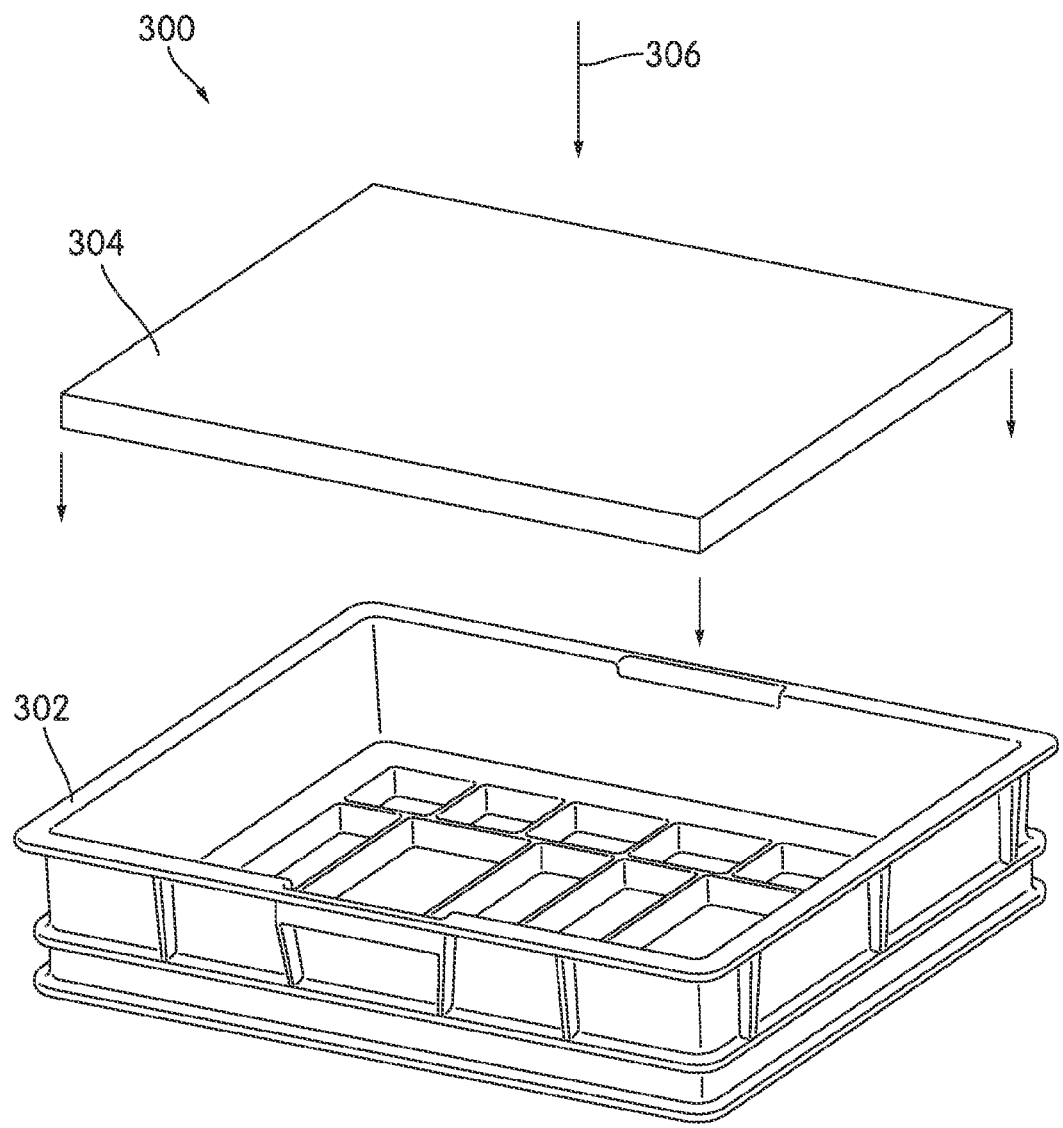
FIG. 3 shows an exploded perspective view of a filter assembly according to an exemplary embodiment.

Referring to FIG. 3, an exploded perspective view of a filter assembly 300 is shown according to an exemplary embodiment. The filter assembly 300 includes a filter frame 302 and a foam media 304. The foam media 304 is glued to the filter frame 302 as both of a filter and flow conditioner. The filter assembly 300 is placed upstream of a MAF sensor. The foam media 304 is used to both filter the air stream 306 and to condition the air stream 306. Foam is used for the foam media 304 because foam media generally has a lower part-to-part variation that significantly reduces a MAF sensor output signal variation because foam allows only small eddies/structures in air flow to pass through. These small eddies/structures are viscous dominant and act as "dampers" to dissipate any larger-scale turbulent structures that introduce higher amount of turbulence kinetic energy of air flow and cause higher variation of MAF sensor signal output. However, foam media is generally less efficient at collecting smaller particles than pleated paper filter media. Accordingly, the foam media may often be oiled, which may lead to oil distribution problems in the media that cause large variations of flow pattern downstream of the foam media thereby affecting MAF sensor output and eliminating the conditioning advantages of the foam media 304.

Figure 4:
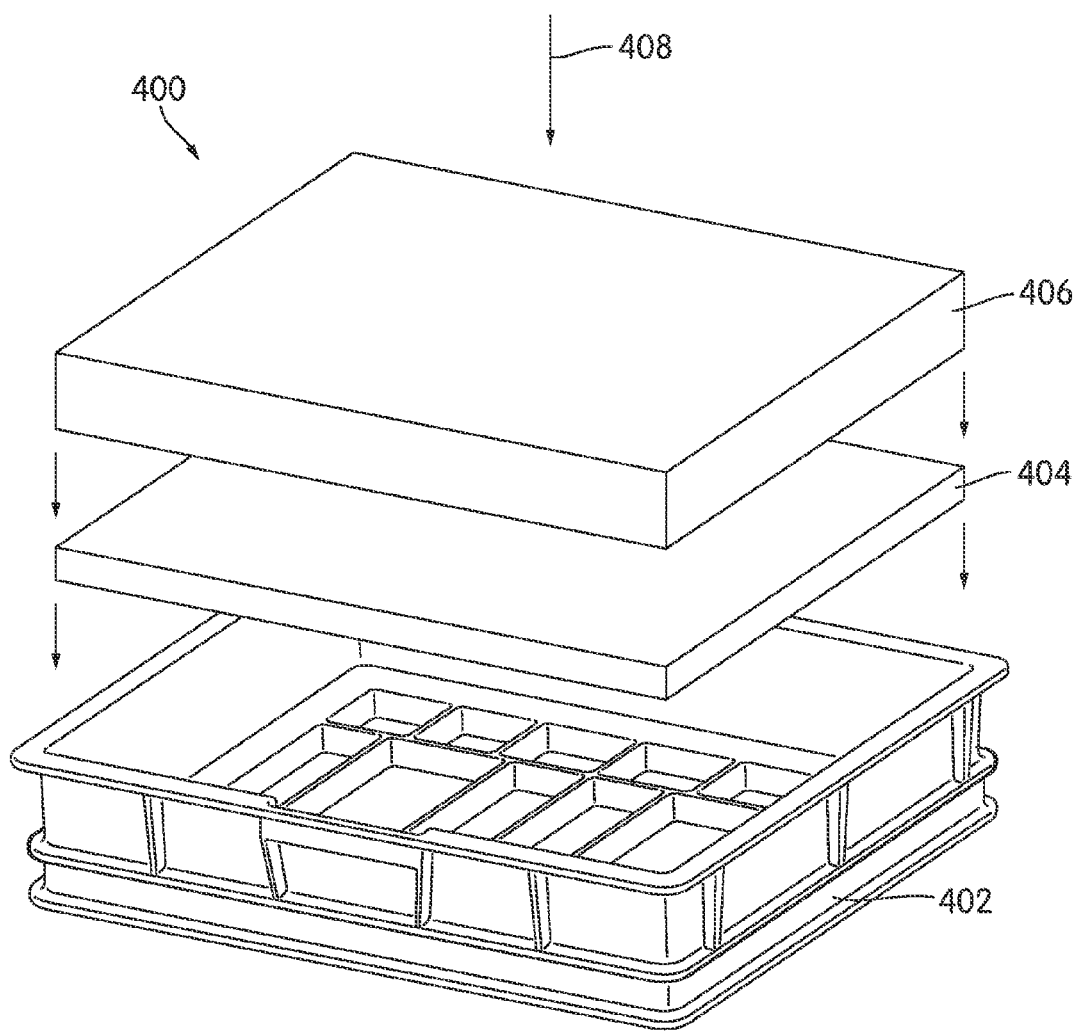
FIG. 4 shows an exploded perspective view of a filter assembly according to an exemplary embodiment.

Referring to FIG. 4, an exploded perspective view of a filter assembly 400 is shown according to an exemplary embodiment. The filter assembly 400 is placed upstream of a MAF sensor. The filter assembly includes a frame 402, a foam media 404, and a pleated media 406. The filter assembly 400 addresses the above noted drawbacks of the filter assembly 300 by adding a block of the pleated media 406 positioned upstream of the foam media 404 to filter the air stream 408 prior to the air stream entering the foam media 404. Accordingly, the foam media 404 is a secondary media in that its primary purpose is to condition the air stream 408 (i.e., to remove the inconsistencies in the air stream 408), not to filter the air stream 408 (i.e., not to remove particles and/or dust in the air stream 408). Since the foam media 404 is not used to filter the air stream 408 (i.e., the air stream 408 is already filtered by the upstream pleated media 406), the foam media 404 does not need to be oiled (i.e., a dry foam is used) such that the foam media 404 is used for conditioning purposes. The foam media 404 reduces the defects of the air stream 408 caused by the pleated filter media 406. The foam media 404 may be secured to the frame 402 via glue or another suitable connection (e.g., overmolding the frame 402 to the foam media 404). The pleated filter media 406 may be secured to the frame via glue or another suitable connection.

Figure 5:
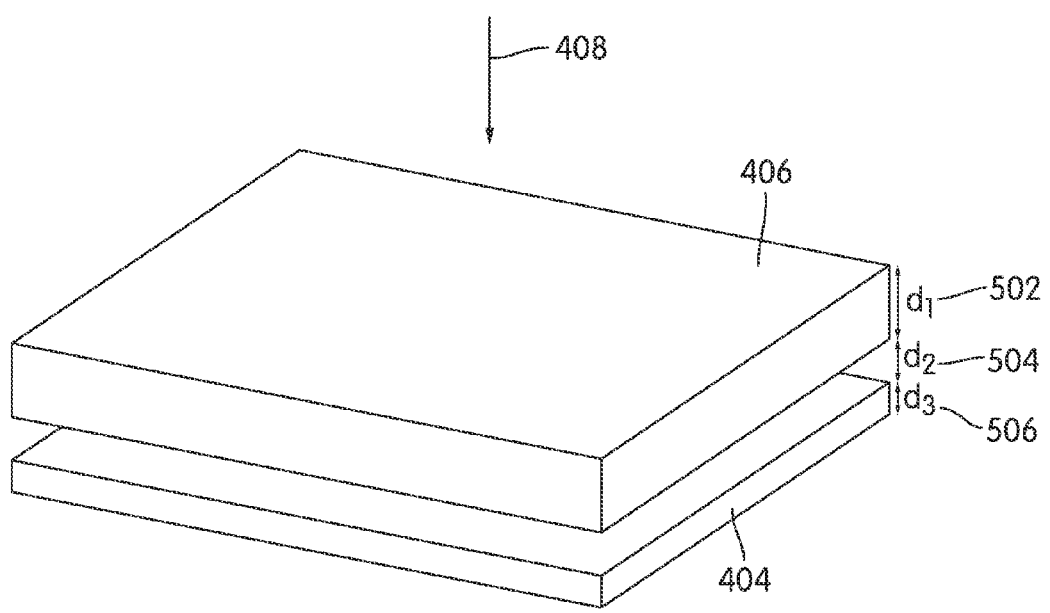
FIG. 5 shows a perspective view of an arrangement of a foam media and a pleated media of the filter assembly of FIG. 4.

Referring to FIG. 5, a perspective view of an arrangement of the foam media 404 and the pleated filter media 406 of the filter assembly 400 is shown. The pleated filter media 406 is placed in an upstream direction of the foam media 404 with respect to the air stream 408. The pleated filter media 406 has a first thickness 502. The clean side of the pleated filter media 406 is offset from the first face of the foam media 404 by a separation distance 504. The foam media 404 has a second thickness 506. The characteristics of the foam media 404 can be adjusted to achieve specific K-factors for the foam media 404. The K-factor of the foam media 404 largely depends on material (e.g., aluminum, polyurethane, etc.), porosity, pore size (e.g., PPI, etc.), thickness, manufacture processes (e.g., flame reticulated, etc.), and the like. In some arrangements, the K-factor for the foam media 404 is approximately 8-10. Additionally, the K-factor may be altered by adjusting various thicknesses and positioning of the foam media 402 and the pleated filter media 406 (e.g., the first thickness 502, the separation distance 504, and the second thickness 506 as set forth in FIG. 5). In some arrangements, a support structure (e.g., a frame or a spacer) is positioned between the foam media 404 and the pleated media 406 to maintain a separation distance 504 greater than zero.

Referring to FIGS. 10-13, close up perspective views of a 30 pores per inch (PPI) foam media are shown according to an exemplary embodiment. Referring to FIGS. 14-17, close up perspective views of a 45 PPI foam media are shown according to an exemplary embodiment. Referring to FIGS. 18-21, close up perspective views of a 30 PPI foam media are shown according to another exemplary embodiment. Referring to FIGS. 22-25, close up perspective views of a 45 PPI foam media are shown according to another exemplary embodiment.

Testing Data

Figure 6:
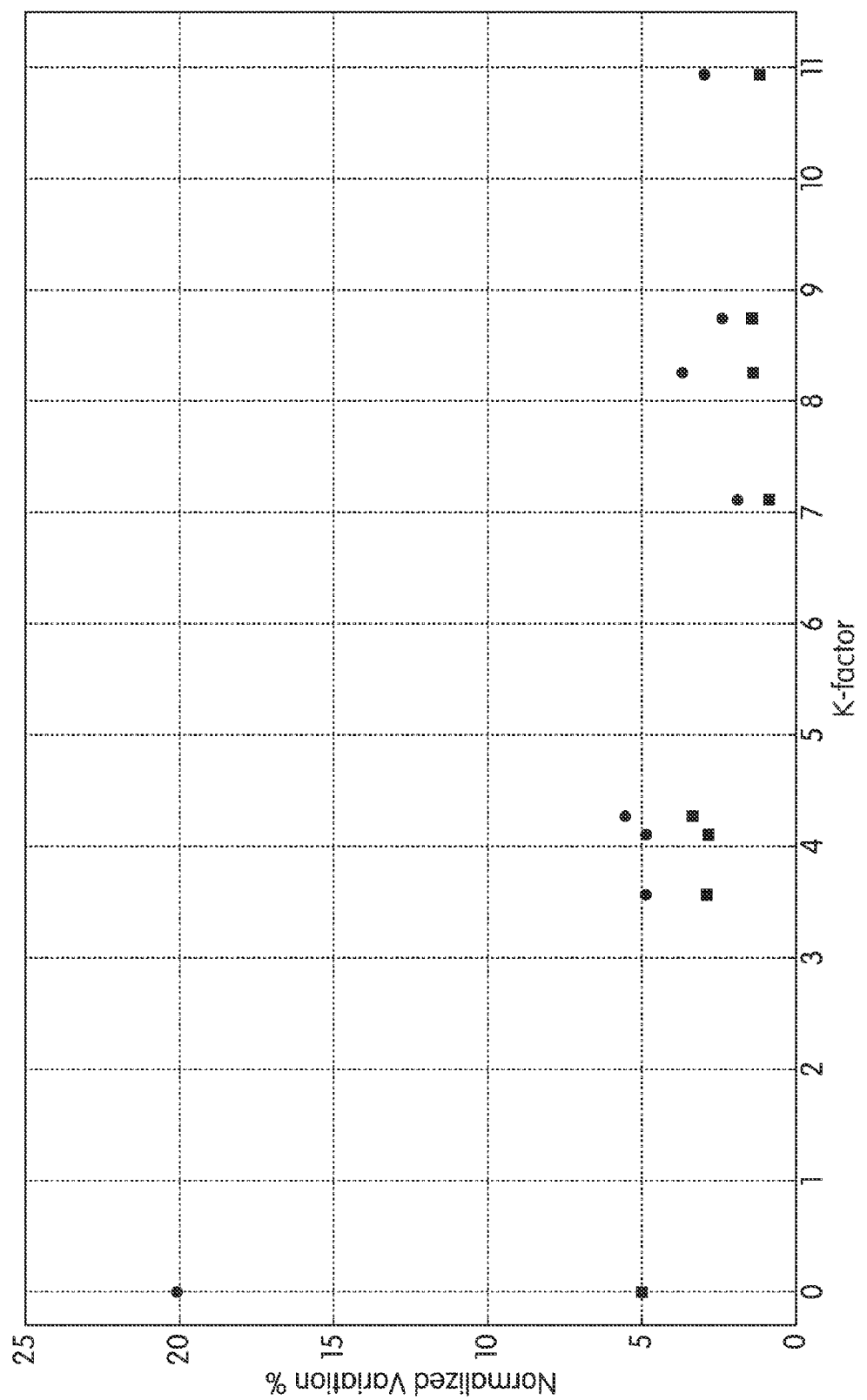
FIGS. 6-7 show various testing data associated with air flow conditioning devices.

Referring to FIGS. 6 through 7, various testing data associated with exemplary air flow conditioning devices is shown.

Other

Figure 8A:
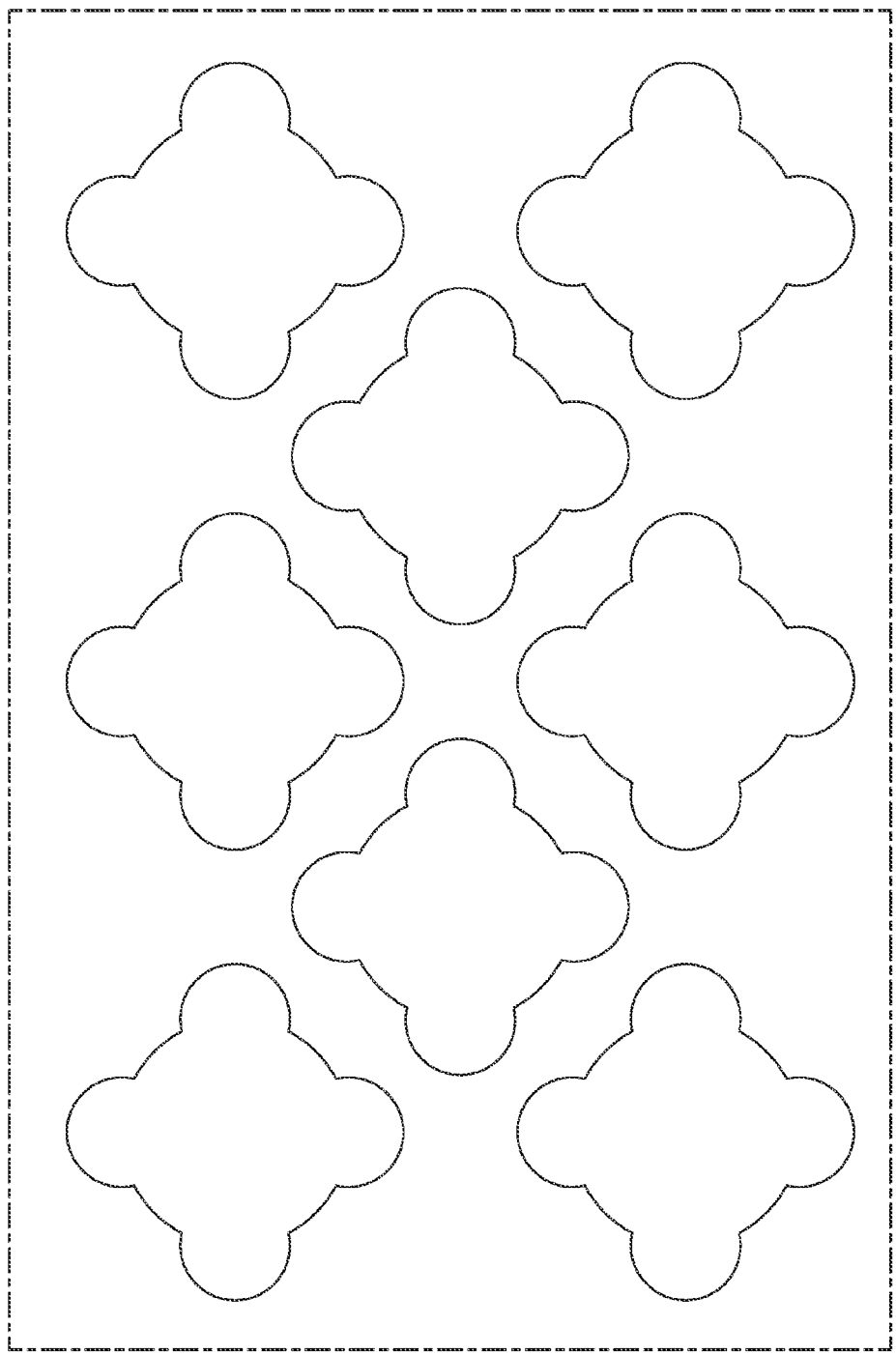
FIGS. 8A through 8H show views of exemplary 2D and 3D fractal arrangements that may be utilized as the second air flow conditioning device.
Figure 8B:
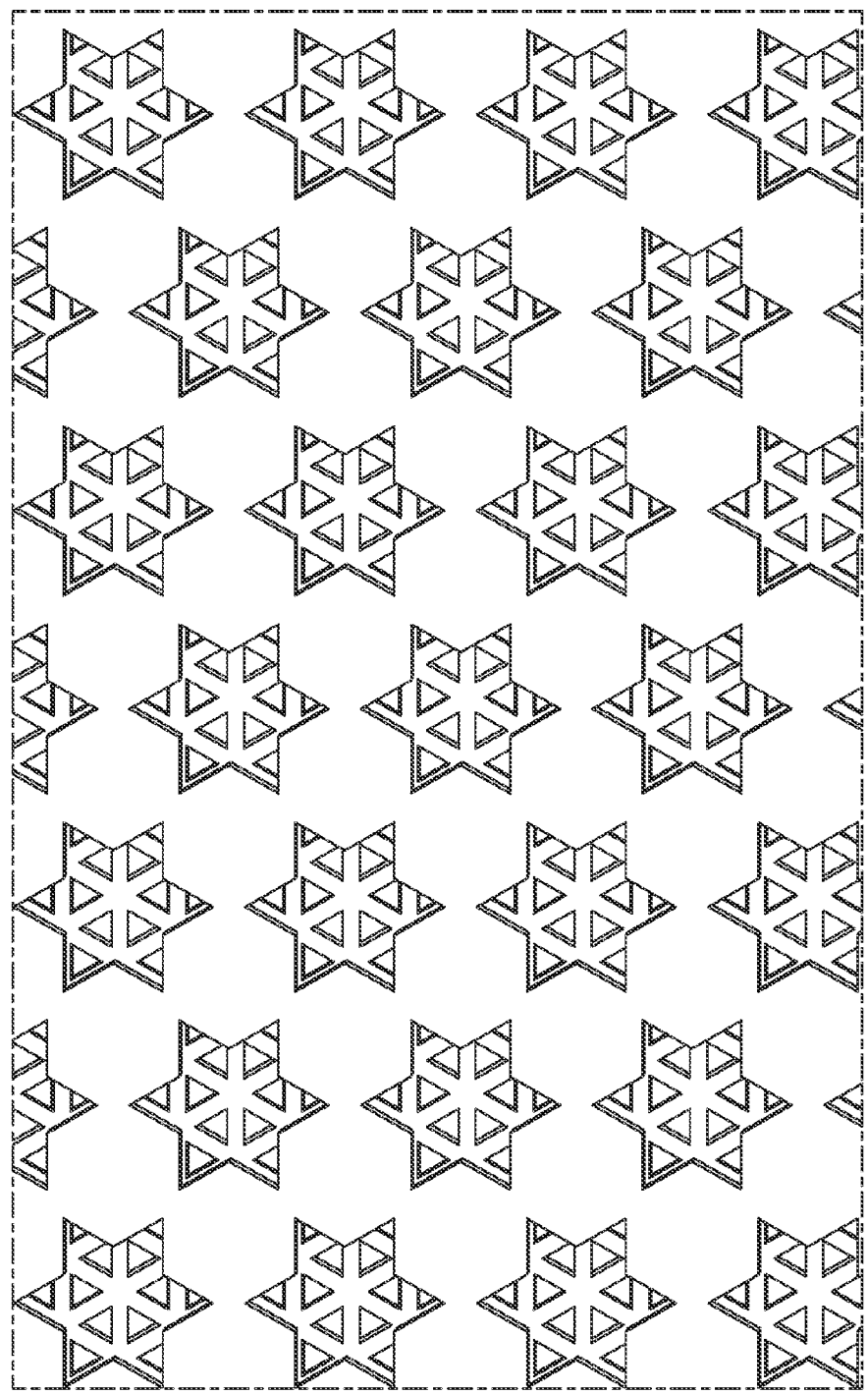
Figure 8C:
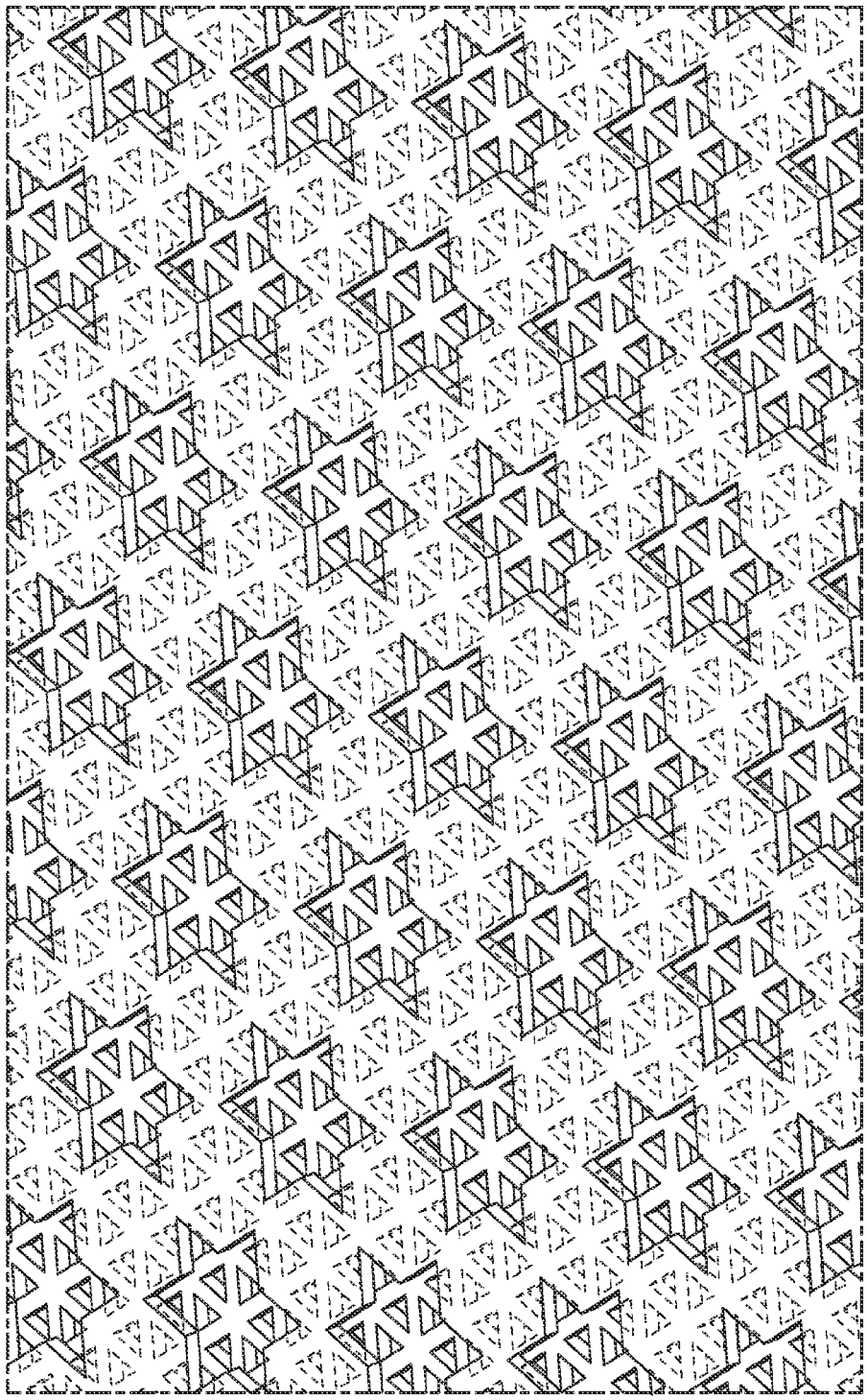
Figure 8D:
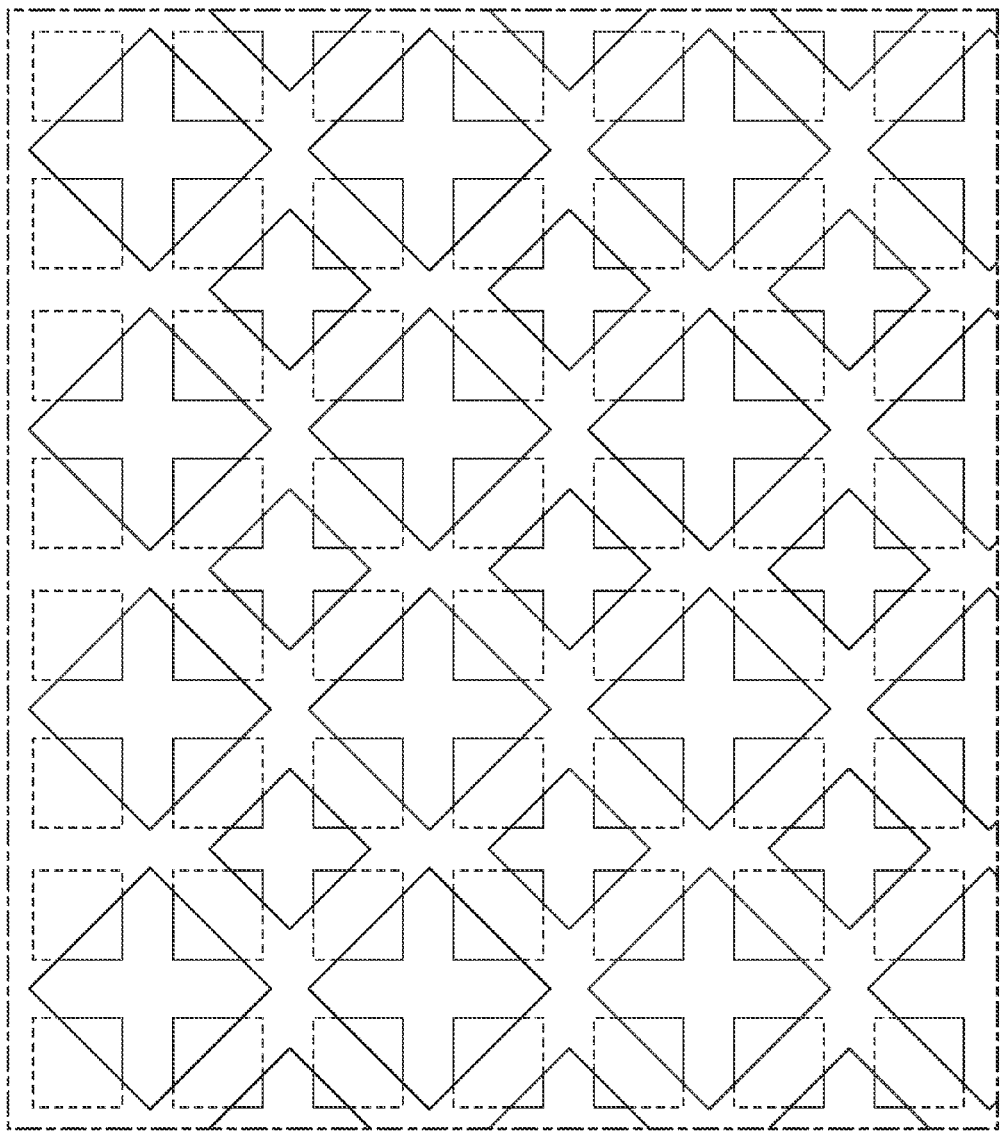
Figure 8E:
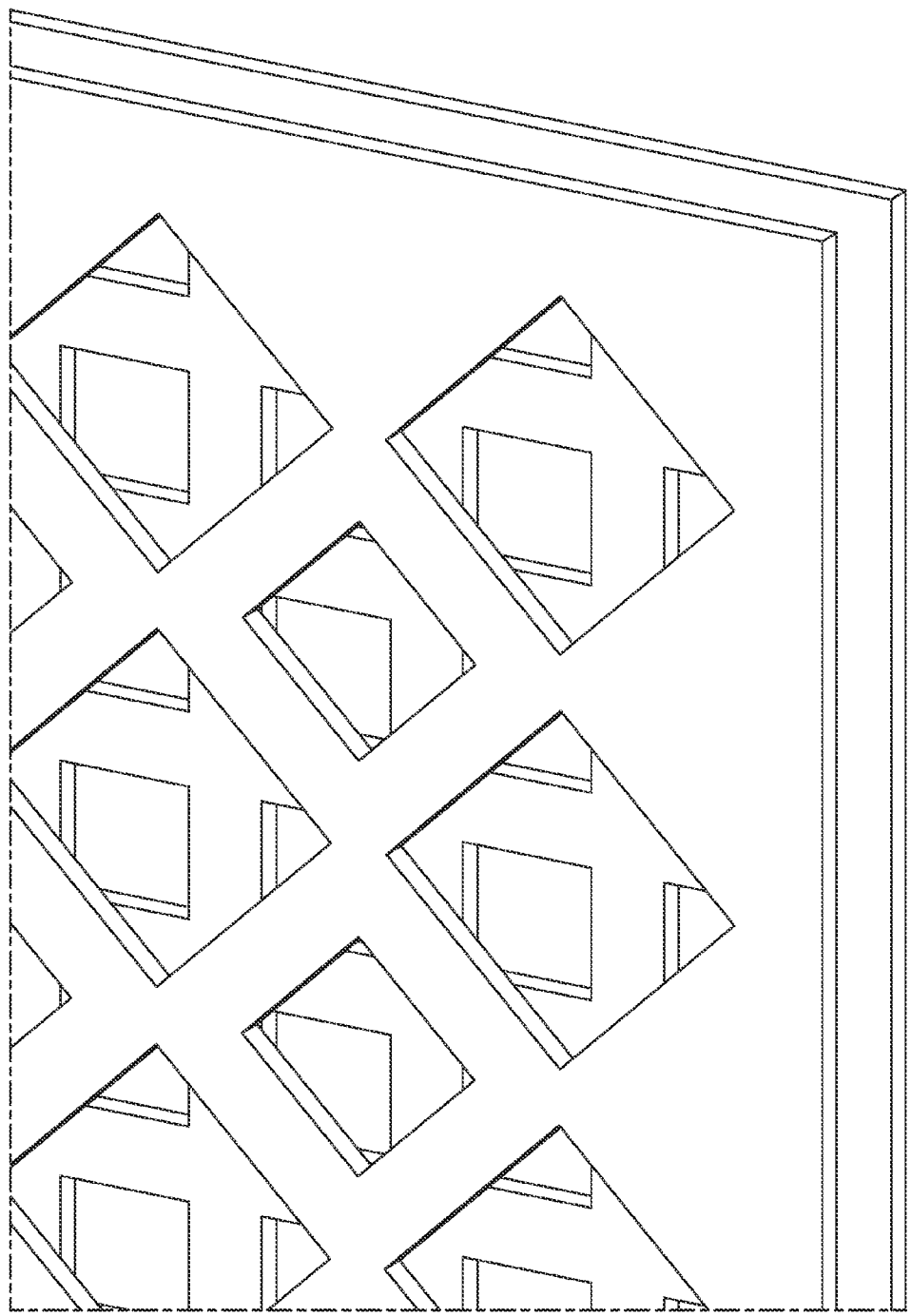
Figure 8F:
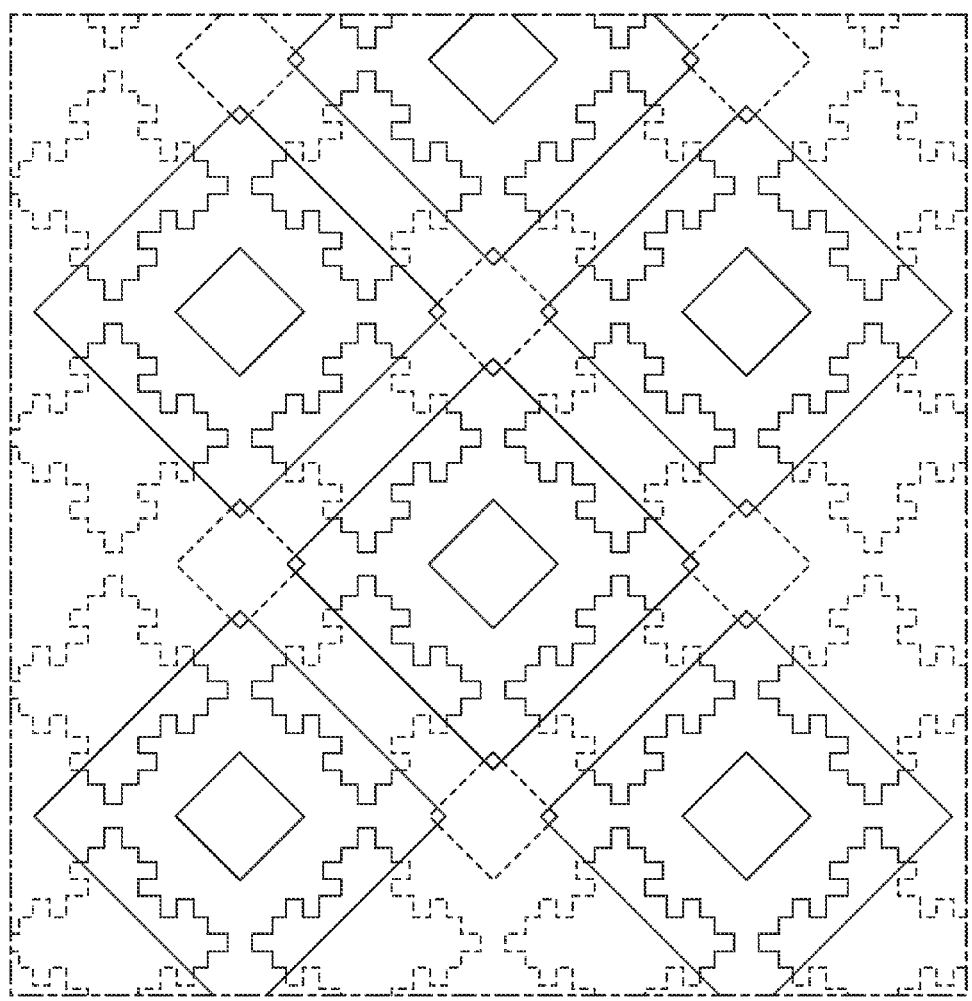
Figure 8G:
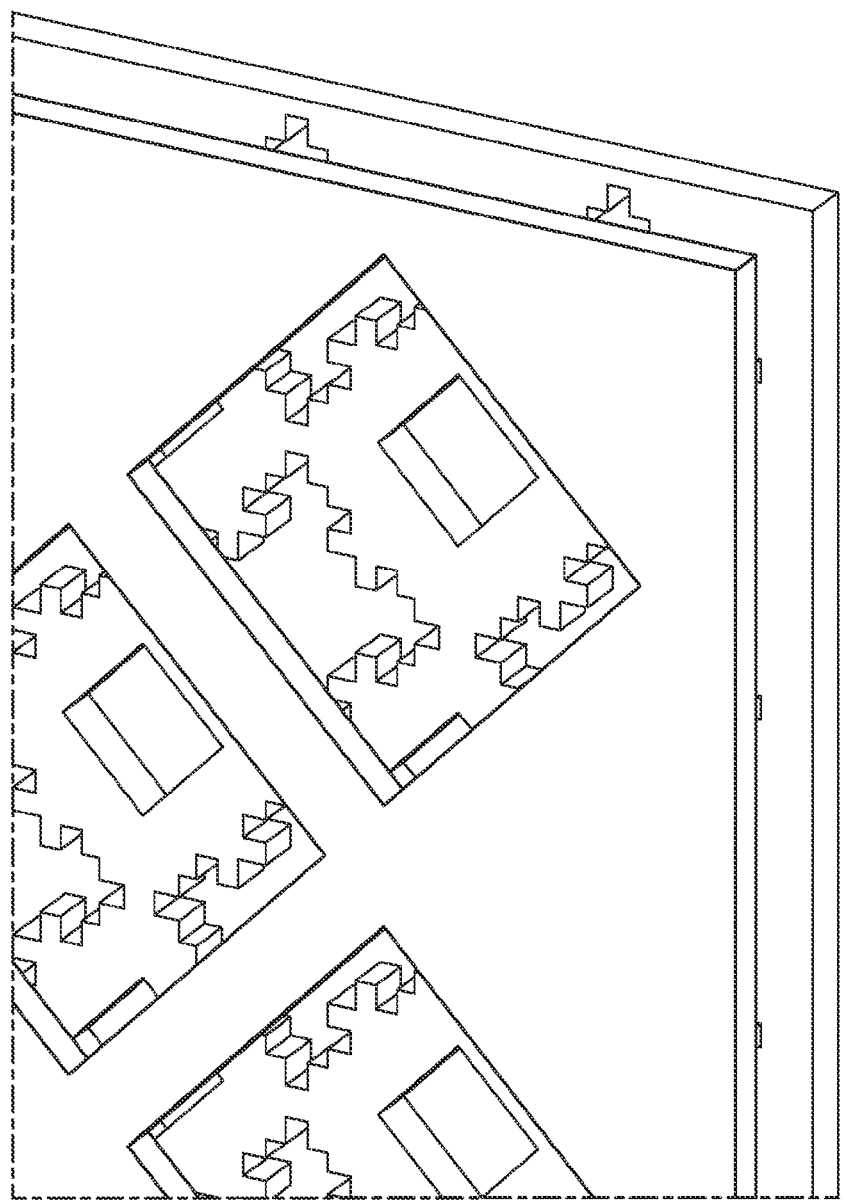
Figure 8H:
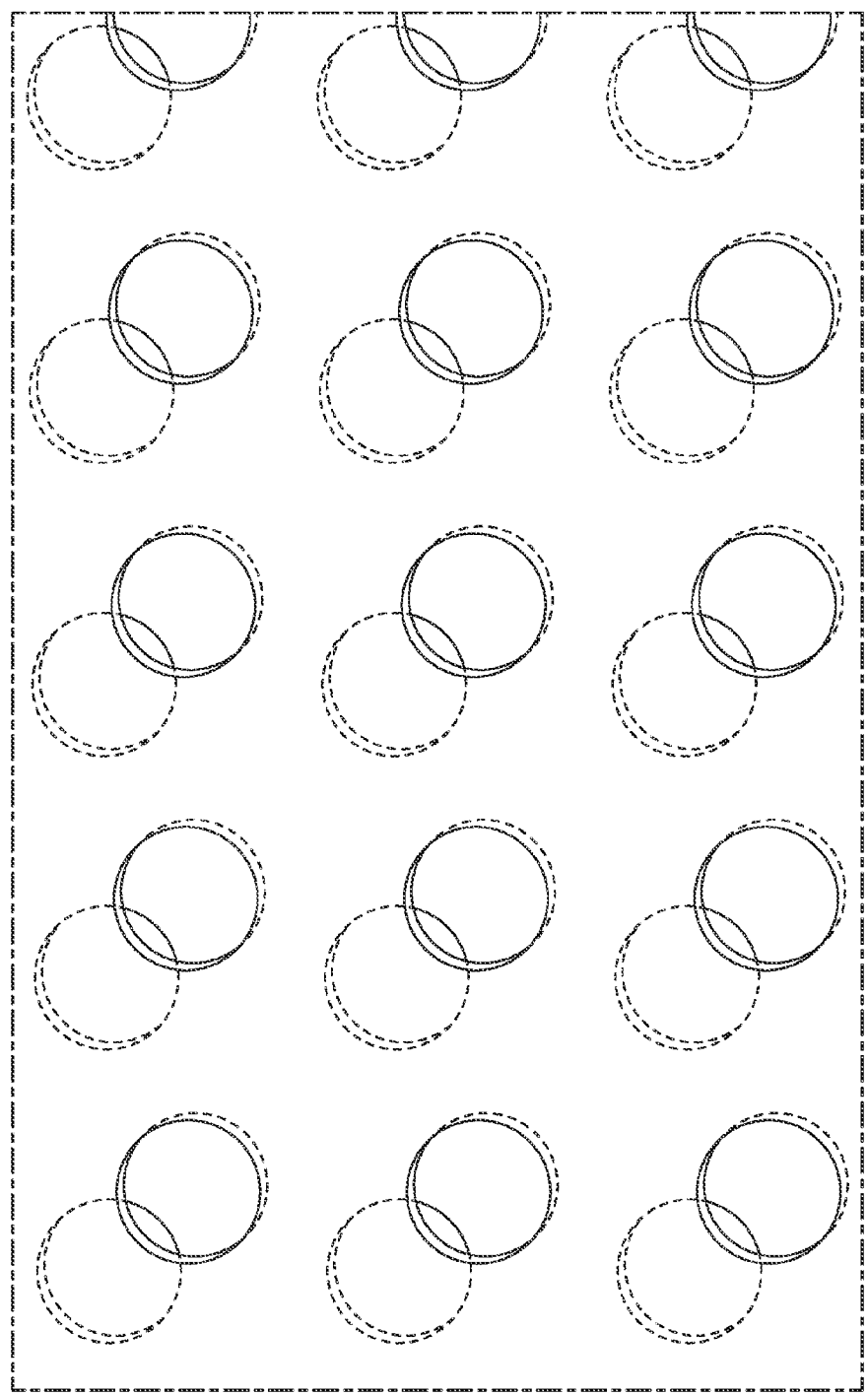

In other arrangements, the secondary air flow conditioning device may be a honeycomb structure or a plastic-molded 2D or 3D structure like a forest, or some kinds of 2D/3D fractal structure. For example, FIGS. 8A through 8F show views of exemplary 2D and 3D fractal arrangements that may be utilized as the second air flow conditioning device. FIG. 8A shows a front view of a circle fractal perforation arrangement. FIGS. 8B and 8C show a triangular star fractal perforation arrangement. FIGS. 8D and 8E show a 3D higher order square fractal perforation arrangement involving two spaced apart perforated conditioners. FIGS. 8F and 8G show a 3D rooted square fractal perforation arrangement based on rotated squares positioned on two spaced apart perforated conditioners. FIG. 8H shows an exemplary 3D fractal arrangement having two plates with round perforations. The round perforations of FIG. 8H are offset from each other such that the holes of a given plate are offset from the previous plate in the air flow direction. In still further arrangements, the secondary air flow conditioning device may be a perforated plate. In these above listed arrangements, the K-factor depends primarily on the % open area (i.e., total "hole area" divided by the total "plate area"), in addition to the size and shape of openings, the arrangement of the openings, and the thicknesses of the conditioning devices (e.g., the honeycomb structure, the forest-like structure, the fractal structure, the plate, etc.). Additionally, in each of the above arrangements, each plate may be arranged in series with one another such that as filtered air flows through the plates, the perforations on each subsequent plate are smaller than the previous plate.

Figure 9A:
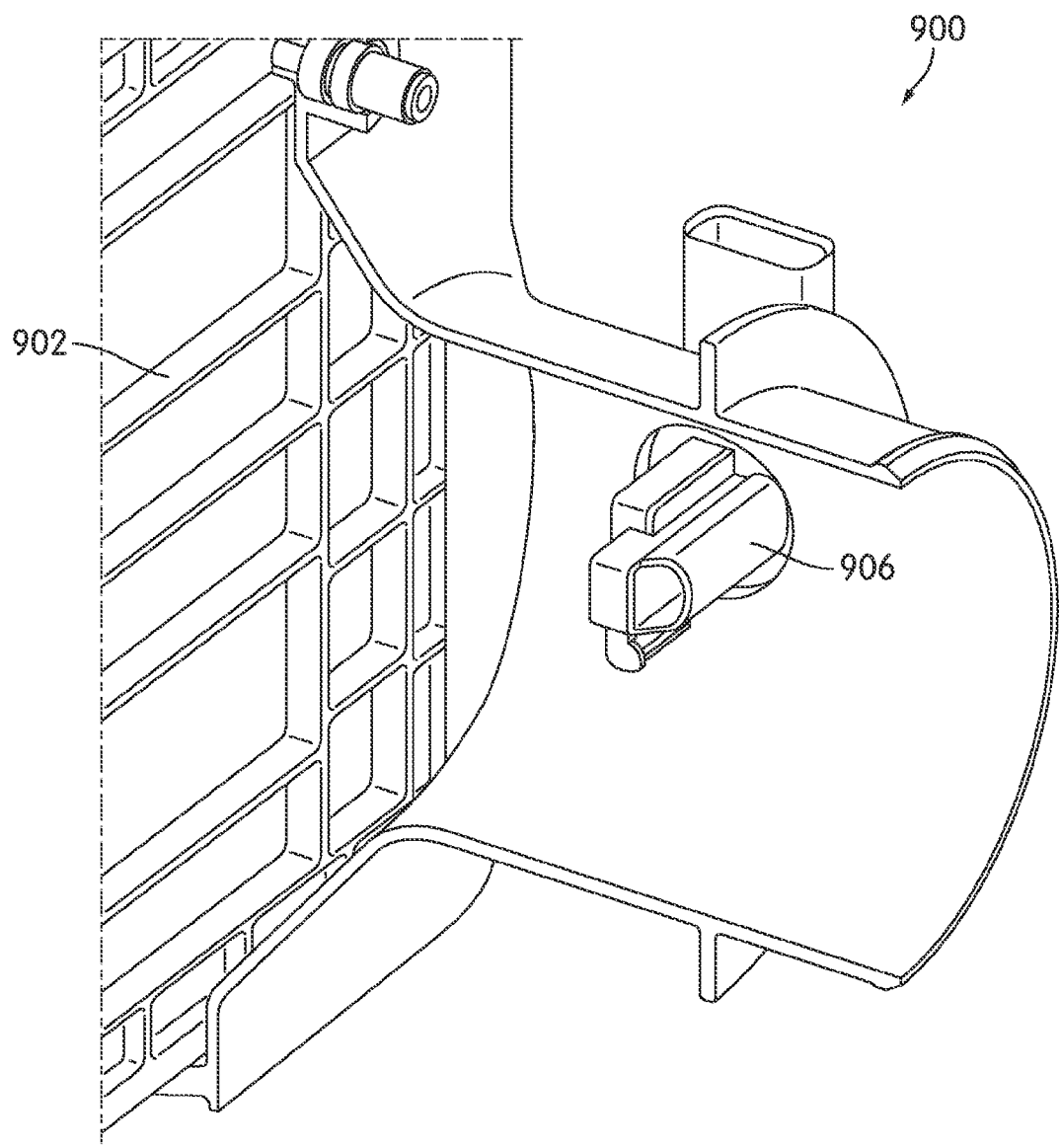
FIGS. 9A and 9B show a schematic of an air filtration system, where a secondary filter and a flow conditioning device are located.
Figure 9B:
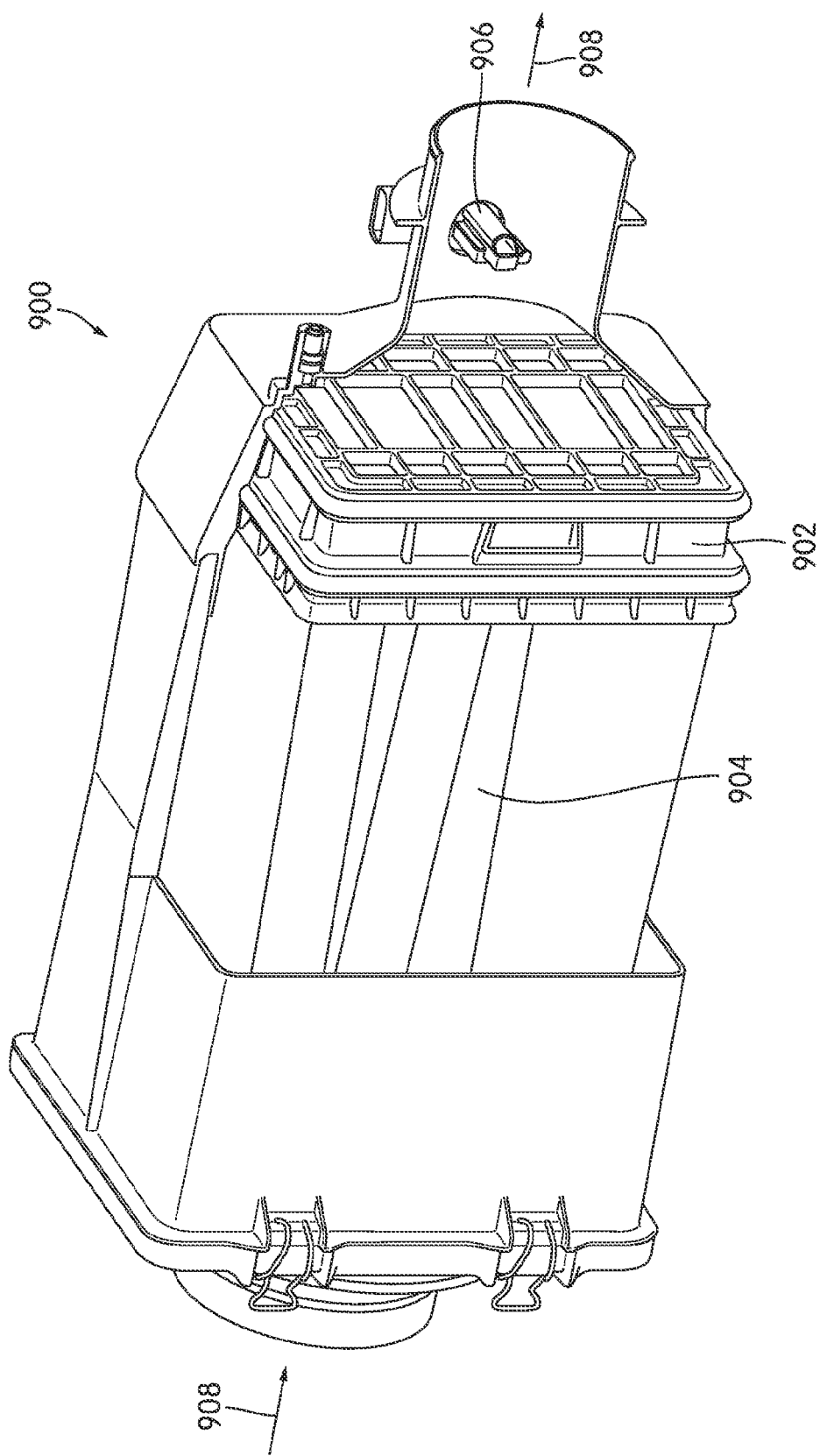
Figure 10:
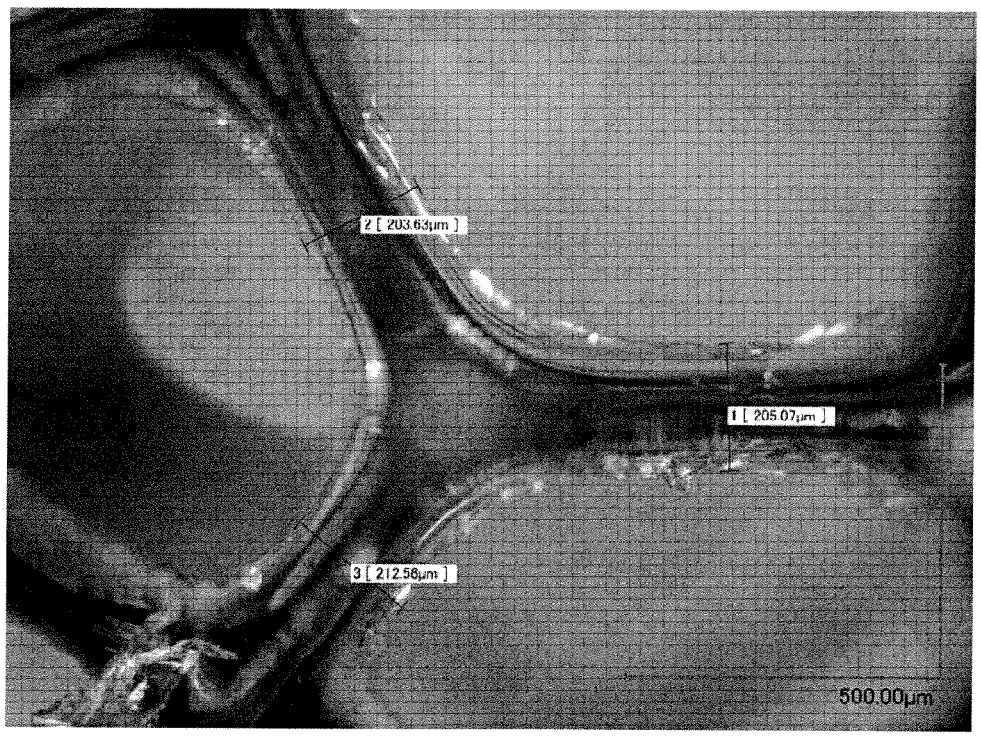
FIGS. 10-13 show close up perspective views of a 30 pores per inch (PPI) foam media according to an exemplary embodiment.
Figure 11:
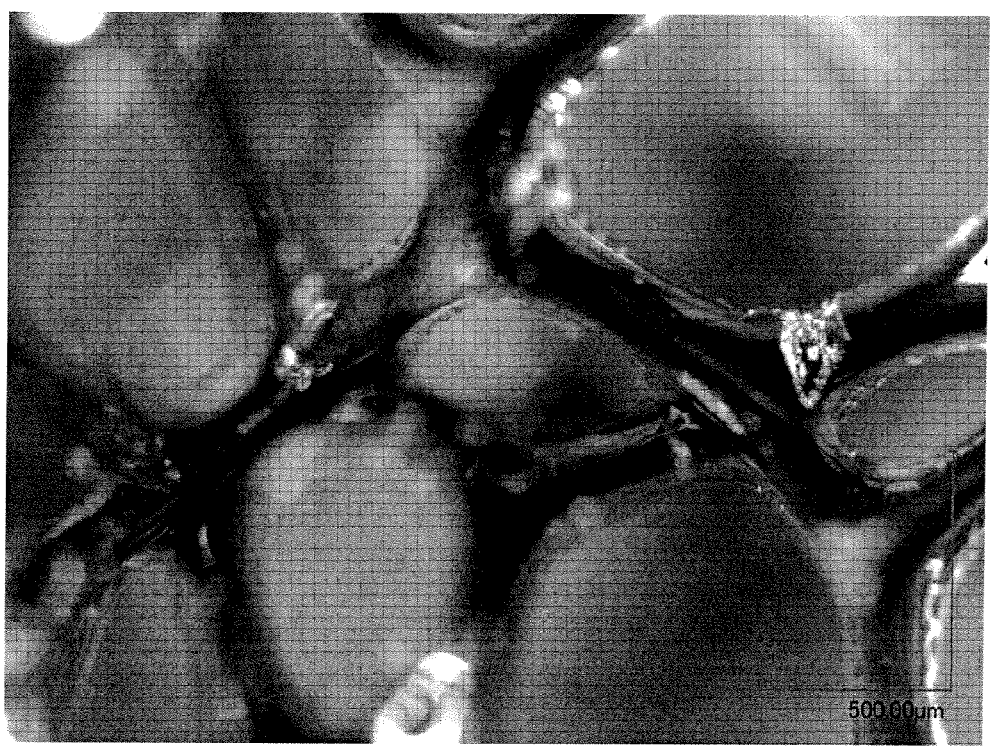
Figure 12:
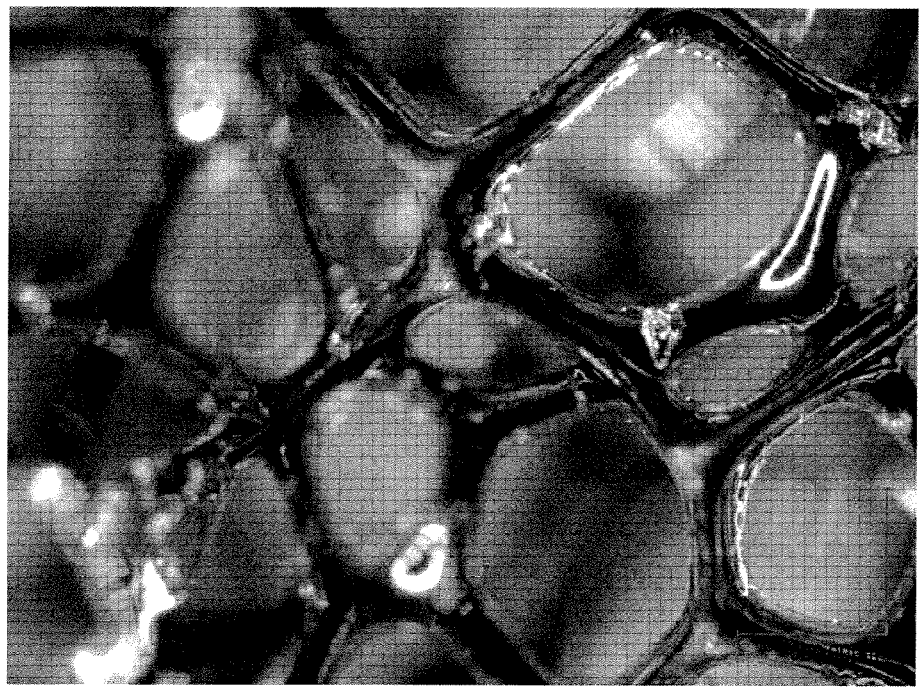
Figure 13:
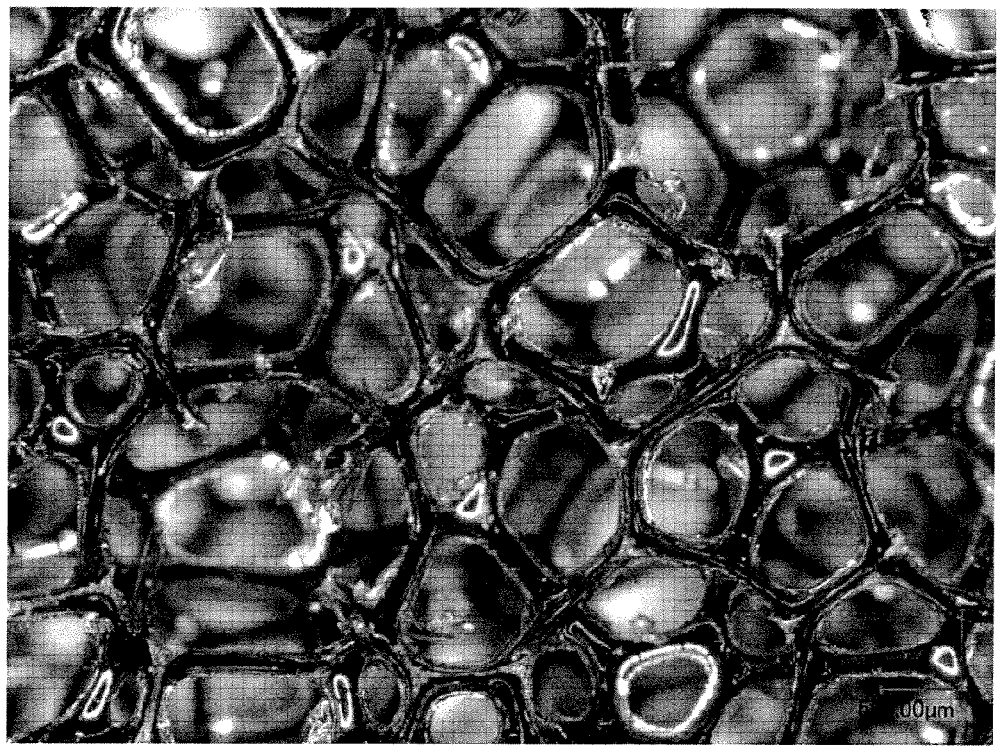
Figure 14:
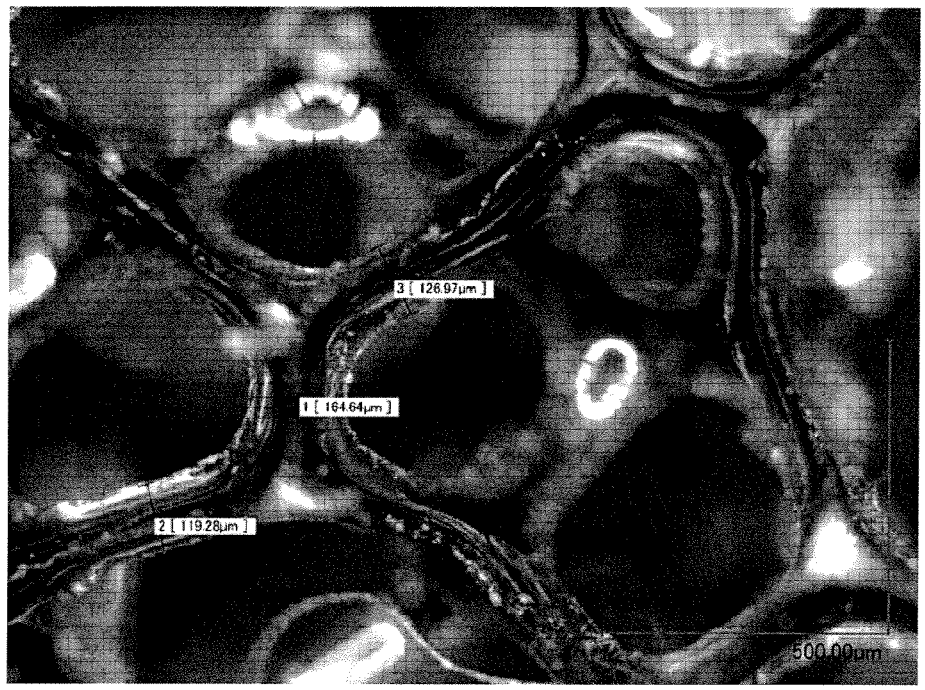
FIGS. 14-17 show close up perspective views of a 45 PPI foam media according to an exemplary embodiment.
Figure 15:
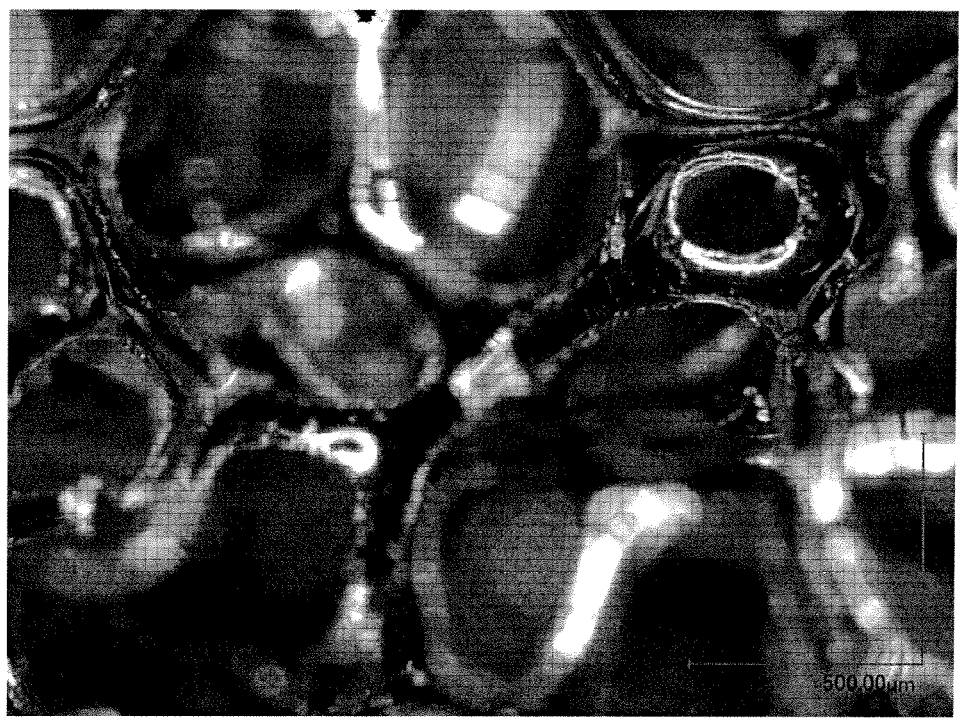
Figure 16:
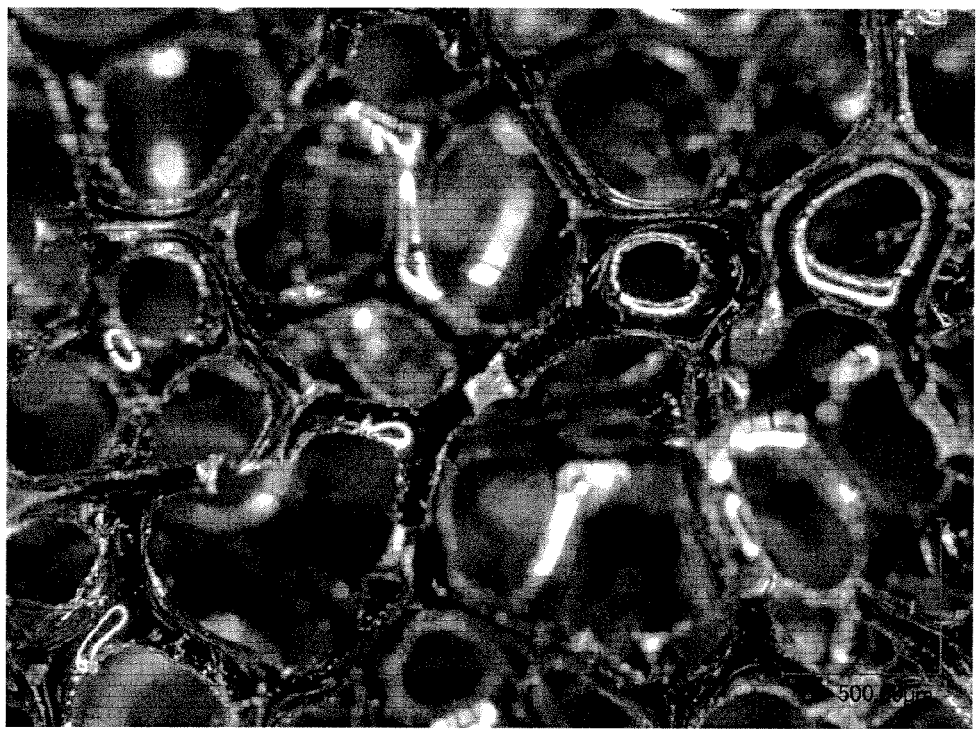
Figure 17:
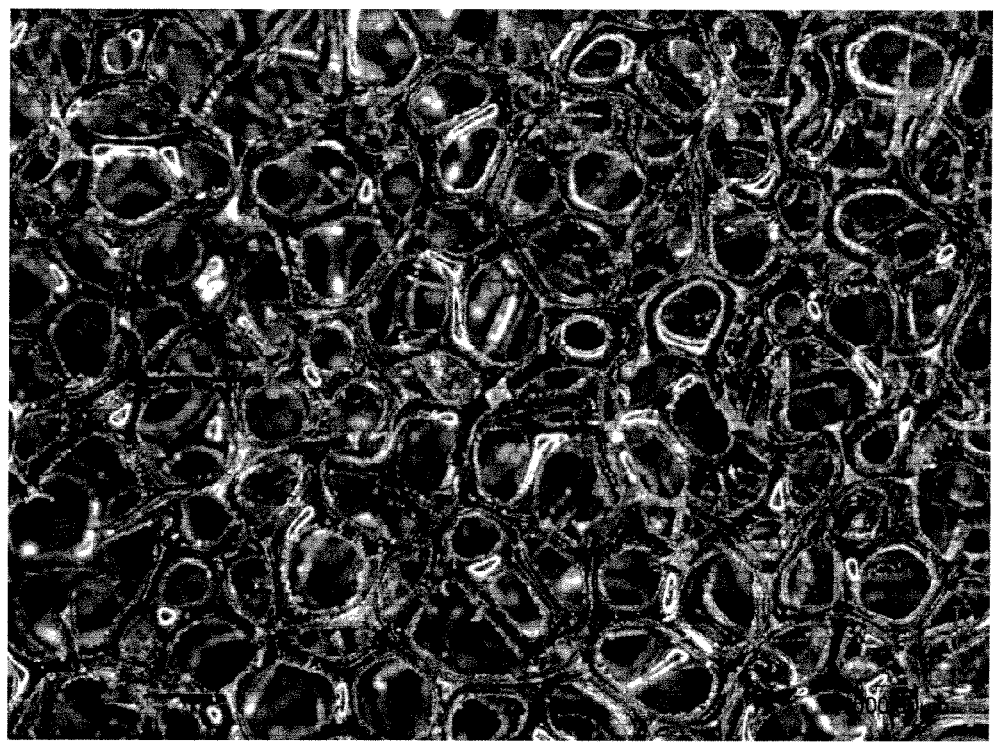
Figure 18:
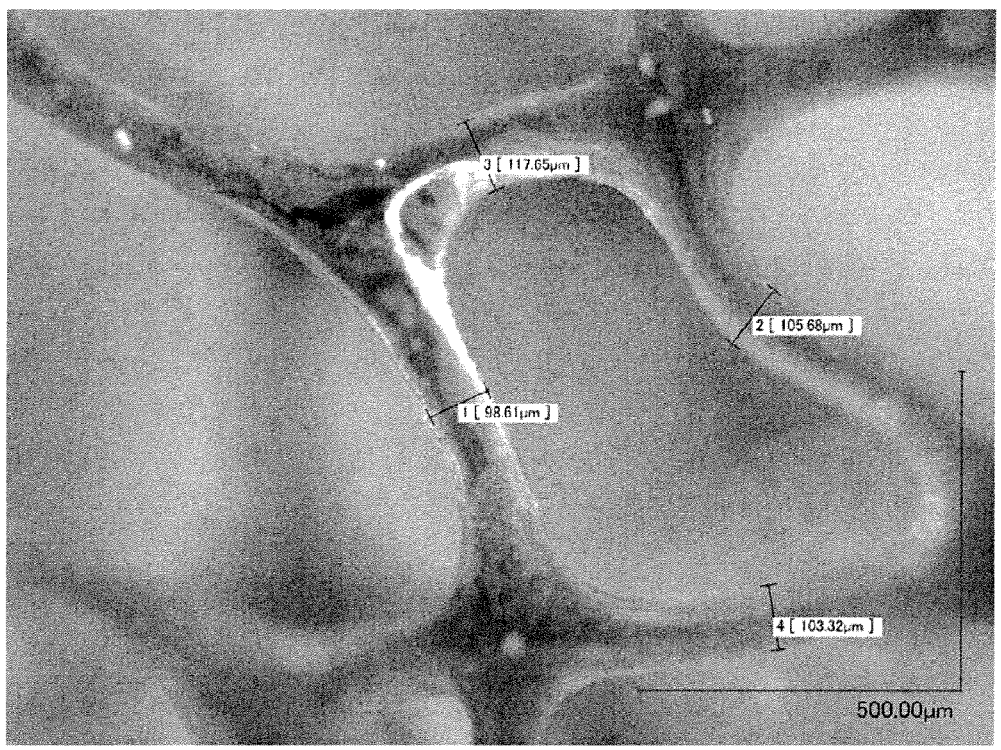
FIGS. 18-21 show close up perspective views of a 30 PPI foam media according to another exemplary embodiment.
Figure 19:
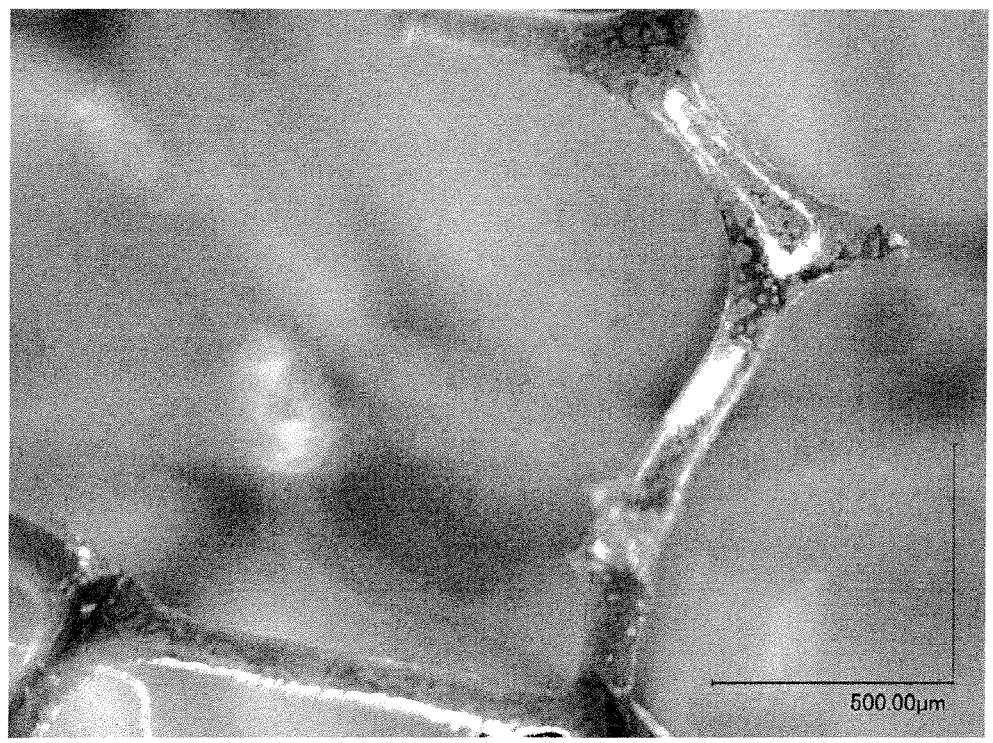
Figure 20:
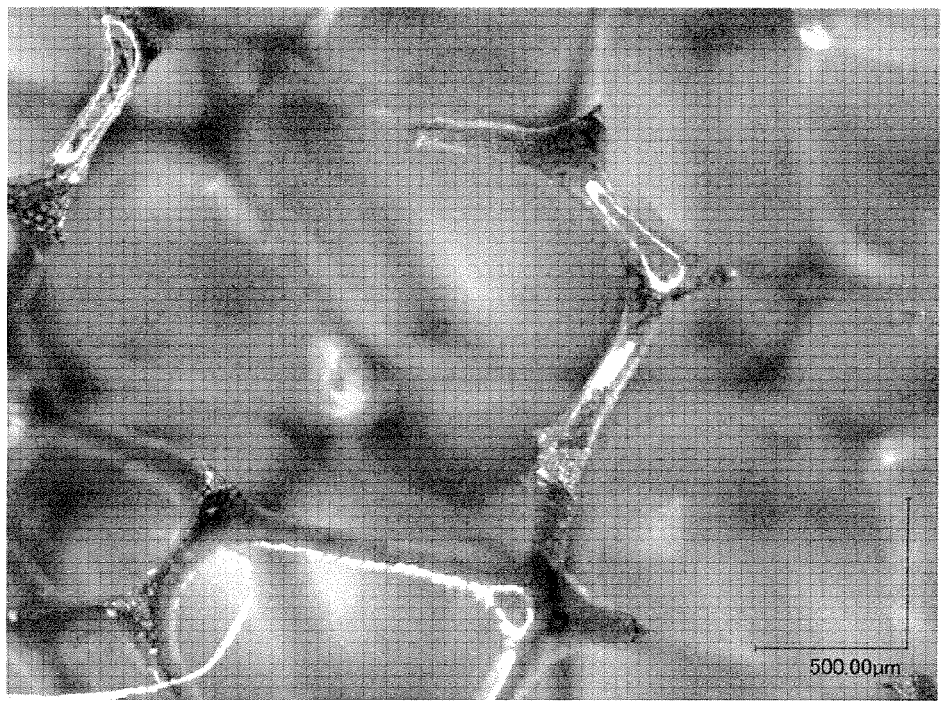
Figure 21:
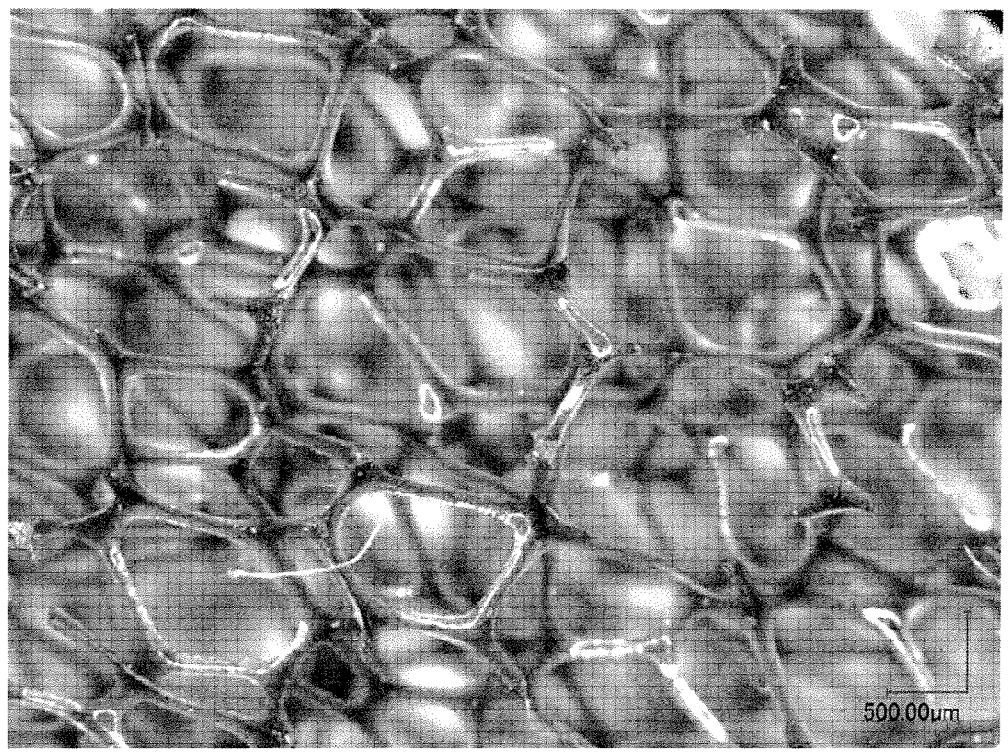
Figure 22:
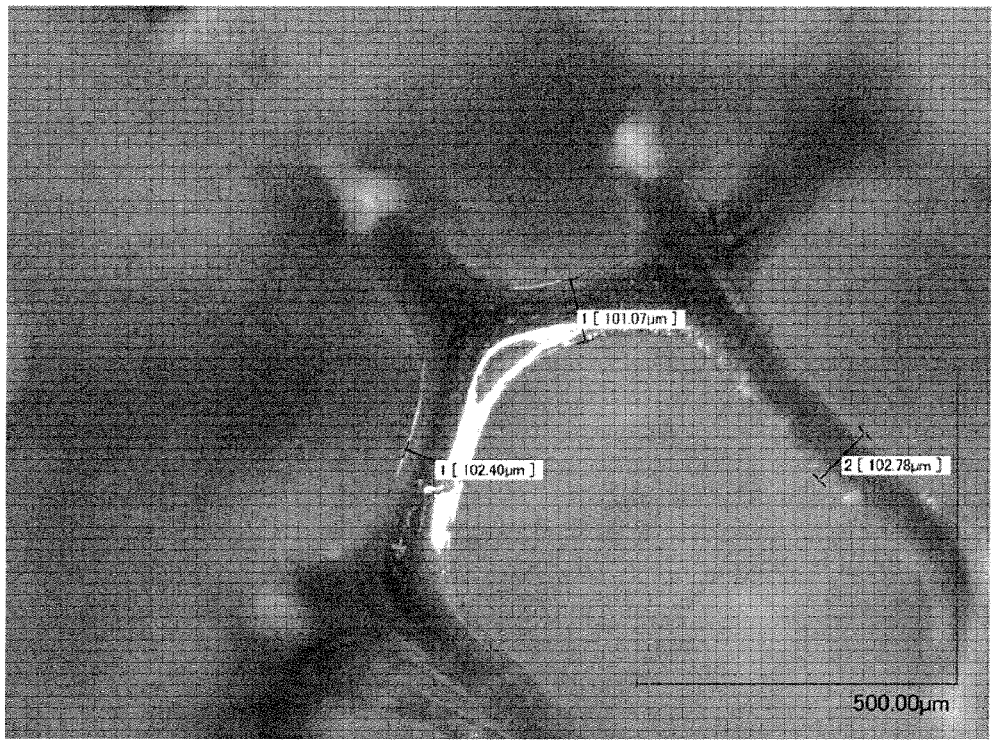
FIGS. 22-25 show close up perspective views of a 45 PPI foam media according to another exemplary embodiment.
Figure 23:
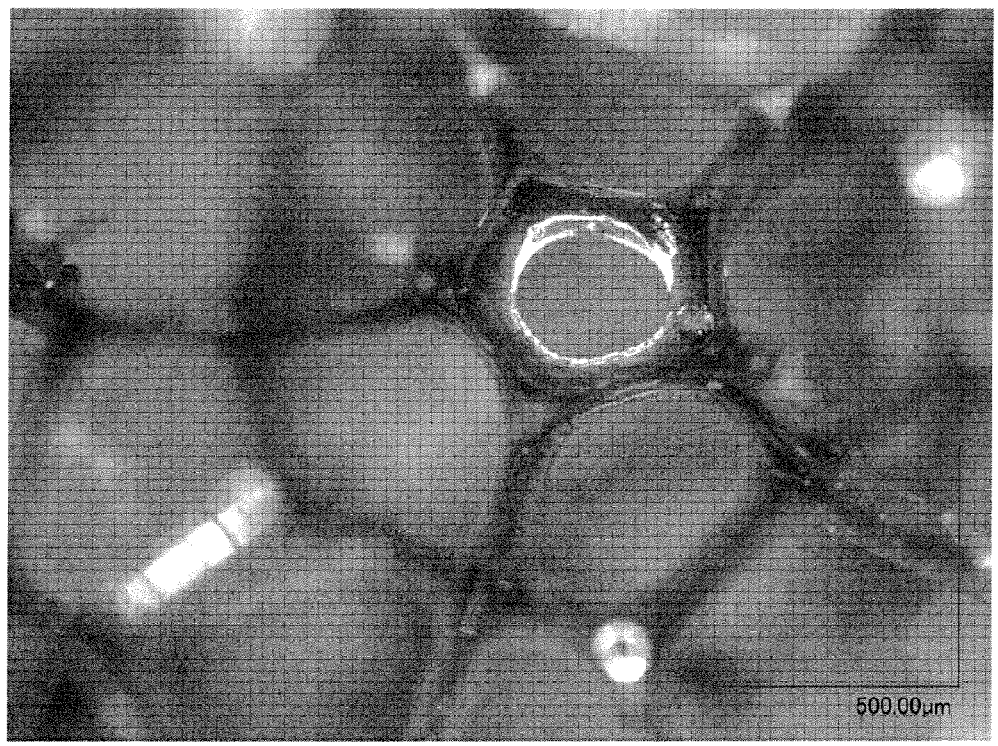
Figure 24:
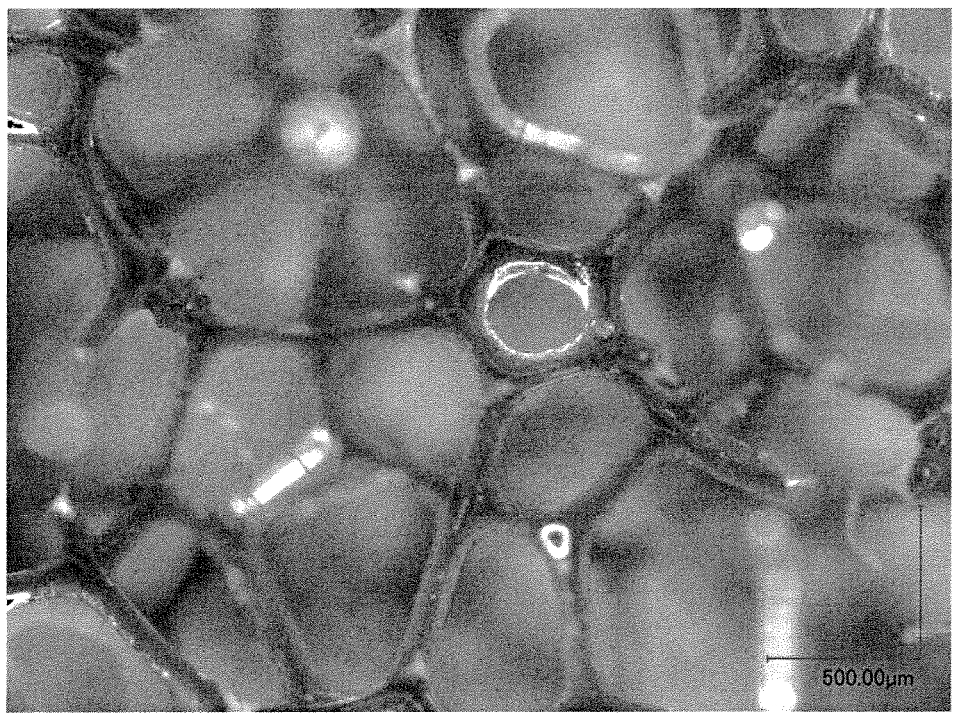
Figure 25:
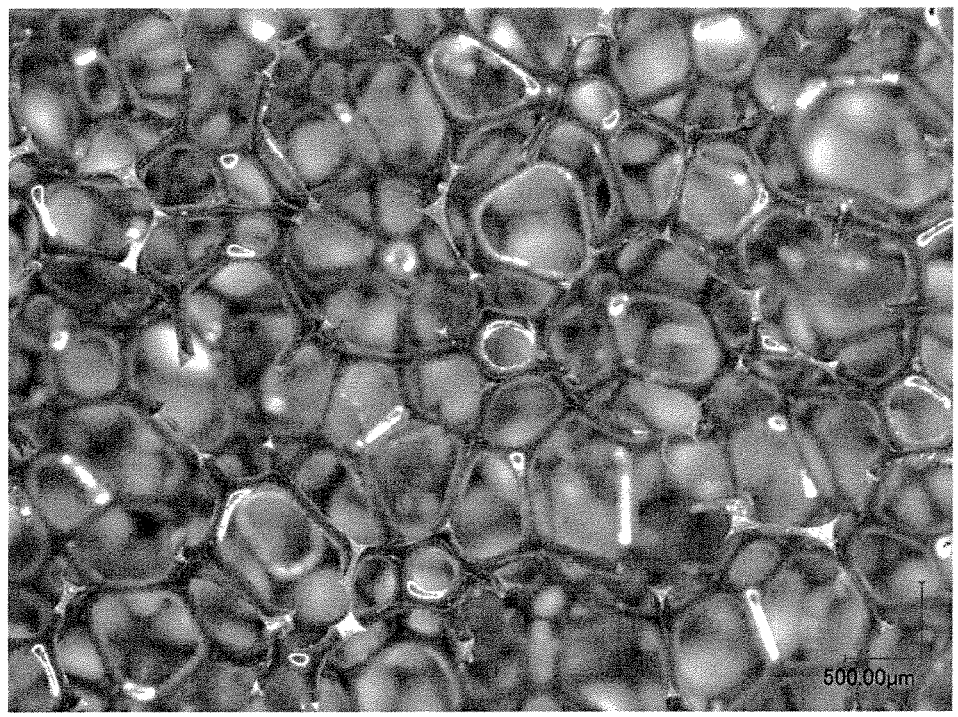

Referring to FIGS. 9A and 9B, perspective partial cutout views of a filter assembly 900 are shown according to an exemplary embodiment. The filter assembly includes a secondary conditioning device 902 placed downstream of a filter media 904 and upstream of a MAF sensor 906 in an air flow direction 908. The secondary conditioning device 902 may include any of the above described air flow conditioning devices.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly comprising:
a panel housing frame comprising a support frame within;
a filter media coupled to an upstream end of the support frame, the filter media having a dirty side configured to receive a stream of air and a clean side configured to output a stream of air that has been filtered through the filter media;
a conditioning device coupled to a downstream end of the support frame, the conditioning device including a mesh panel, the conditioning device positioned in a downstream direction from the clean side of the filter media with respect to the stream of air, the conditioning device offset from the clean side of the filter media by a separation distance maintained by the support frame, a portion of the conditioning device aligned with a mass air flow sensor downstream of the mesh panel, the conditioning device configured to condition the stream of air through the portion of the conditioning device before the stream of air impacts the mass air flow sensor.

2. The filter assembly of claim 1, wherein the mesh panel has a varying pore pattern and pore size.

3. The filter assembly of claim 2, wherein the mesh panel includes a first section having a large pore pattern, a second section having a medium pore pattern, and a third section having a small pore pattern, wherein the third section is the portion of the conditioning device aligned with a mass air flow sensor positioned downstream of the mesh panel such that the stream of air impacting the mass air flow sensor is conditioned the most.

4. The filter assembly of claim 1, wherein the mesh is planar.

5. The filter assembly of claim 1, wherein the mesh is concave or convex with respect to an air flow direction.

6. The filter assembly of claim 1, wherein the mesh is molded into the support frame.

7. A filter assembly comprising:
 a panel housing frame comprising a support frame within;
 filter media coupled to an upstream end of the support frame, the filter media having a dirty side configured to receive a stream of air and a clean side configured to output a stream of air that has been filtered through the filter media;
 a conditioning device coupled to a downstream end of the support frame, wherein the flow conditioning device comprises a foam panel, the conditioning device positioned in a downstream direction from the clean side of the filter media with respect to the stream of air, the conditioning device offset from the clean side of the filter media by a separation distance such that an open space exists between the conditioning device and the filter media maintained by the support frame, a portion of the conditioning device aligned with a mass air flow sensor downstream of the foam panel, the conditioning device configured to condition the stream of air through the portion of the conditioning device before the stream of air impacts the mass air flow sensor.

8. The filter assembly of claim 7, wherein the foam panel is glued to the support frame.

9. The filter assembly of claim 7, wherein the foam panel is configured to both filter the stream of air and condition the stream of air.

10. The filter assembly of claim 7, wherein the foam panel is comprised of a 30 pore per inch foam media or a 45 pores per inch foam media.

11. The filter assembly of claim 1, wherein the filter media is a pleated media having a pleat-to-pleat distance, and wherein the separation distance is between 0.1 and 100 times the pleat-to-pleat distance.

12. The filter assembly of claim 1, wherein the separation distance is between 6 mm and 8 mm.

13. The filter assembly of claim 1, wherein the mesh panel of the conditioning device comprises a honeycomb structure.

14. The filter assembly of claim 1, wherein the mesh panel of the conditioning device comprises a fractal structure.

15. A method of filtering a stream of air, the method comprising:
 providing a filter assembly including a panel housing frame comprising a support frame within, a filter media coupled to an upstream end of the support frame, and a conditioning device coupled to a downstream end of the support frame and positioned in a downstream direction from a clean side of the filter media with respect to the stream of air, wherein the conditioning device is offset from the clean side of the filter media by a separation distance maintained by the support frame;
 providing a mass air flow sensor positioned downstream of the conditioning device with respect to the stream of air;
 routing the stream of air through the filter media;
 after passing through the filter media routing the stream of air through the conditioning device, the conditioning device including a mesh panel; and
 routing at least a portion of the stream of air past the mass air flow sensor.

16. The method of claim 15, further comprising providing, by the mass air flow sensor, a feedback signal to an engine control module relating to a characteristic of the air stream.

17. The method of claim 15, wherein the mesh panel has a first section having a large pore pattern, a second section having a medium pore pattern, and a third section having a small pore pattern.

18. The method of claim 17, further comprising aligning the third section of the mesh panel with the mass air flow sensor such that an air stream impacting the mass air flow sensor passes through the third section.

19. The method of claim 15, further comprising molding the conditioning device to the support frame.

* * * * *